(12) United States Patent
Bagai et al.

(10) Patent No.: US 11,103,013 B2
(45) Date of Patent: Aug. 31, 2021

(54) PIVOTABLE CHARGING CASE FOR ELECTRONIC SMOKING DEVICE

(71) Applicant: FONTEM HOLDINGS 1 B.V., Amsterdam (NL)

(72) Inventors: Hitesh Bagai, Bristol (GB); Andreas Ingo Beer, Grasbrunn (DE)

(*) Notice: Subject to any disclaimer, the term of this patent is extended or adjusted under 35 U.S.C. 154(b) by 163 days.

(21) Appl. No.: 16/124,563

(22) Filed: Sep. 7, 2018

(65) Prior Publication Data
US 2020/0077699 A1 Mar. 12, 2020

(51) Int. Cl.
| | |
|---|---|
| *H02J 7/00* | (2006.01) |
| *A24F 40/90* | (2020.01) |
| *A24F 40/00* | (2020.01) |
| *A24F 40/95* | (2020.01) |

(52) U.S. Cl.
CPC ............. *A24F 40/90* (2020.01); *A24F 40/00* (2020.01); *A24F 40/95* (2020.01); *H02J 7/0021* (2013.01); *H02J 7/0045* (2013.01); *H02J 7/0047* (2013.01); *H02J 7/00034* (2020.01)

(58) Field of Classification Search
CPC ...... H02J 7/0047; H02J 7/0021; H02J 7/0045; A24F 15/00; A24F 40/00; A24F 40/90; A24F 40/95
USPC ................................................. 320/107, 114
See application file for complete search history.

(56) References Cited

U.S. PATENT DOCUMENTS

| | | | | |
|---|---|---|---|---|
| 8,464,867 B2 * | 6/2013 | Holloway | .......... | B65D 85/1056 206/250 |
| 8,556,071 B2 * | 10/2013 | Holloway | .......... | B65D 85/1056 206/250 |
| 8,899,239 B2 * | 12/2014 | Hon | ...................... | A24B 15/167 131/270 |
| 8,910,641 B2 * | 12/2014 | Hon | ....................... | H02J 7/0045 131/273 |
| 8,973,587 B2 * | 3/2015 | Liu | ...................... | H02J 7/0042 131/273 |
| 8,978,663 B2 * | 3/2015 | Newton | .................. | A24F 15/18 131/347 |
| 9,281,705 B2 * | 3/2016 | Xiang | ..................... | H02J 7/007 |
| 9,350,181 B2 * | 5/2016 | Xiang | ....................... | H02J 7/32 |
| 9,357,802 B2 * | 6/2016 | Liu | ......................... | A24F 15/18 |
| 9,360,379 B2 * | 6/2016 | Liu | ......................... | G01K 13/00 |
| 9,364,027 B2 * | 6/2016 | Hon | ....................... | A61K 9/007 |

(Continued)

FOREIGN PATENT DOCUMENTS

| | | | | |
|---|---|---|---|---|
| CH | 560520 A5 * | 4/1975 | ............ | A24F 15/12 |
| EP | 3292771 A1 | 3/2018 | | |
| WO | 2015/051376 A1 | 10/2014 | | |

*Primary Examiner* — John T Trischler

(74) *Attorney, Agent, or Firm* — Dykema Gossett PLLC

(57) ABSTRACT

A charging case for electronic cigarettes includes a container configured to house the electronic smoking device, a micro-control unit ("MCU"), configured to facilitate charging a first rechargeable battery for the electronic smoking device, a plurality of connecting pins configured to facilitate electrical coupling between the electronic smoking device and the MCU; and a connector movably coupled with the container and configured to connect the MCU to external circuitry. A system comprises an electronic smoking device comprising a battery, an eCig memory, and control electronics, and a charging case comprising a container, a micro-control unit ("MCU"), a connector, and a charging case battery.

20 Claims, 13 Drawing Sheets

(56) References Cited

U.S. PATENT DOCUMENTS

| | | | |
|---|---|---|---|
| 9,427,024 B2* | 8/2016 | Liu | A24F 47/008 |
| 9,433,242 B1 | 9/2016 | Buffone | A24F 15/18 |
| 9,438,049 B2* | 9/2016 | Xiang | H02J 7/007 |
| 9,502,917 B2* | 11/2016 | Xiang | H02J 7/0077 |
| 9,538,783 B2* | 1/2017 | Xiang | A24F 15/18 |
| 9,682,800 B2* | 6/2017 | Xiang | A24F 15/12 |
| 9,713,346 B2* | 7/2017 | Hon | A24F 40/40 |
| 9,717,279 B2* | 8/2017 | Hon | H02J 7/0045 |
| 9,854,846 B2* | 1/2018 | Alarcon | A24F 47/008 |
| 9,893,543 B2* | 2/2018 | Miller | F21L 4/08 |
| D815,346 S * | 4/2018 | Bagai | D27/191 |
| 9,985,455 B2* | 5/2018 | Alarcon | H02J 7/007 |
| 10,051,893 B2* | 8/2018 | Hoffman | H02J 7/0042 |
| 10,081,531 B2* | 9/2018 | Murison | A24B 15/167 |
| 10,090,693 B2* | 10/2018 | Alarcon | H02J 7/00 |
| 10,098,383 B2* | 10/2018 | Alarcon | H02J 7/00041 |
| 10,099,916 B2* | 10/2018 | Murison | H02J 7/0042 |
| 10,123,569 B2* | 11/2018 | Hon | H02J 7/0045 |
| 10,131,532 B2* | 11/2018 | Murison | H05B 3/141 |
| 10,138,113 B2* | 11/2018 | Murison | A24F 15/18 |
| 10,179,721 B2* | 1/2019 | Teruzzi | H02G 11/02 |
| 10,202,272 B2* | 2/2019 | Murison | H02J 7/342 |
| 10,202,273 B2* | 2/2019 | Gorilovsky | B67D 7/54 |
| 10,202,274 B2* | 2/2019 | Murison | G05B 19/4166 |
| 10,207,914 B2* | 2/2019 | Murison | F04B 43/046 |
| 10,266,388 B2* | 4/2019 | Gorilovsky | H05B 1/0244 |
| 10,276,898 B2* | 4/2019 | Leadley | H02J 7/007 |
| 10,287,154 B2* | 5/2019 | Gorilovsky | B67D 7/78 |
| 10,287,155 B2* | 5/2019 | Murison | A24F 15/18 |
| 10,327,478 B2* | 6/2019 | Hon | A24F 40/40 |
| 10,342,264 B2* | 7/2019 | Hon | H02J 7/0045 |
| RE47,573 E * | 8/2019 | Hon | H05B 1/0202 |
| 10,472,226 B2* | 11/2019 | Murison | B67D 7/78 |
| 10,651,684 B2* | 5/2020 | Alarcon | H02J 50/40 |
| 2009/0283103 A1* | 11/2009 | Nielsen | H02J 7/0044 131/273 |
| 2011/0265806 A1* | 11/2011 | Alarcon | A24F 40/50 131/273 |
| 2012/0227753 A1* | 9/2012 | Newton | A24F 47/008 131/347 |
| 2012/0261285 A1* | 10/2012 | Holloway | B65D 85/1048 206/250 |
| 2012/0261286 A1* | 10/2012 | Holloway | B65D 85/1054 206/268 |
| 2013/0169230 A1* | 7/2013 | Li | H02J 7/0044 320/114 |
| 2013/0298922 A1* | 11/2013 | Xiang | A24F 47/008 131/329 |
| 2013/0336358 A1* | 12/2013 | Liu | H02J 7/00 374/152 |
| 2013/0342157 A1* | 12/2013 | Liu | A24F 15/18 320/107 |
| 2014/0007892 A1* | 1/2014 | Liu | G08C 23/02 131/329 |
| 2014/0014125 A1* | 1/2014 | Fernando | H01M 10/0525 131/328 |
| 2014/0053857 A1* | 2/2014 | Liu | H02J 7/00 131/329 |
| 2014/0062417 A1* | 3/2014 | Li | H02J 7/0086 320/136 |
| 2014/0083443 A1* | 3/2014 | Liu | A24F 47/008 131/329 |
| 2014/0097103 A1* | 4/2014 | Cameron | A24F 47/008 206/38 |
| 2014/0251324 A1* | 9/2014 | Xiang | A24F 47/008 128/202.21 |
| 2014/0251356 A1* | 9/2014 | Xiang | A24F 47/008 131/329 |
| 2014/0253020 A1* | 9/2014 | Xiang | H02J 7/0029 320/107 |
| 2014/0258741 A1* | 9/2014 | Xiang | G06F 1/24 713/300 |
| 2014/0261499 A1* | 9/2014 | Hon | A24F 47/008 131/329 |
| 2014/0283856 A1* | 9/2014 | Xiang | A24F 47/008 131/329 |
| 2014/0285937 A1* | 9/2014 | Xiang | H02H 3/202 361/91.2 |
| 2014/0291179 A1* | 10/2014 | Xiang | A24F 15/12 206/216 |
| 2014/0305820 A1* | 10/2014 | Xiang | A24F 15/18 206/236 |
| 2014/0318560 A1* | 10/2014 | Hon | A24F 40/40 131/329 |
| 2014/0354231 A1* | 12/2014 | Xiang | A24F 47/008 320/114 |
| 2014/0360512 A1* | 12/2014 | Xiang | H02J 7/00712 131/328 |
| 2014/0375249 A1* | 12/2014 | Xiang | H02J 7/0047 320/107 |
| 2015/0002076 A1* | 1/2015 | Xiang | A24F 47/008 320/107 |
| 2015/0015186 A1* | 1/2015 | Xiang | H02J 7/045 320/107 |
| 2015/0015187 A1* | 1/2015 | Xiang | H02J 7/007 320/107 |
| 2015/0027466 A1* | 1/2015 | Xiang | H02J 7/342 131/329 |
| 2015/0034507 A1* | 2/2015 | Liu | A24F 15/01 206/256 |
| 2015/0036250 A1* | 2/2015 | Xiang | H02J 7/0029 361/78 |
| 2015/0082859 A1* | 3/2015 | Xiang | G01F 1/00 73/1.35 |
| 2015/0100441 A1* | 4/2015 | Alarcon | G07F 9/023 705/16 |
| 2015/0102777 A1* | 4/2015 | Cooper | H02J 7/0045 320/114 |
| 2015/0164138 A1* | 6/2015 | Liu | A24F 47/008 206/268 |
| 2015/0189917 A1* | 7/2015 | Xiang | A24F 15/00 131/328 |
| 2015/0327596 A1* | 11/2015 | Alarcon | H04L 67/22 131/328 |
| 2015/0328415 A1* | 11/2015 | Minskoff | A61M 15/06 128/202.21 |
| 2015/0333542 A1* | 11/2015 | Alarcon | A24F 47/008 131/328 |
| 2015/0333552 A1* | 11/2015 | Alarcon | A24F 47/008 131/329 |
| 2015/0333561 A1* | 11/2015 | Alarcon | A24F 40/90 131/329 |
| 2016/0111903 A1* | 4/2016 | Miller | H02J 2207/40 362/183 |
| 2016/0150824 A1* | 6/2016 | Memari | H02J 7/35 131/329 |
| 2016/0204637 A1* | 7/2016 | Alarcon | H02J 7/0045 320/114 |
| 2016/0213068 A1* | 7/2016 | Hon | H05B 1/0202 |
| 2016/0270451 A1* | 9/2016 | Hon | A61K 9/007 |
| 2016/0345628 A1* | 12/2016 | Sabet | H04M 1/72527 |
| 2016/0366946 A1* | 12/2016 | Murison | H05B 1/0227 |
| 2017/0042214 A1* | 2/2017 | Murison | A24F 15/18 |
| 2017/0042224 A1* | 2/2017 | Murison | B67D 7/78 |
| 2017/0042233 A1* | 2/2017 | Murison | B65D 85/70 |
| 2017/0042234 A1* | 2/2017 | Gorilovsky | B67D 7/78 |
| 2017/0042235 A1* | 2/2017 | Gorilovsky | B67D 7/0288 |
| 2017/0042236 A1* | 2/2017 | Gorilovsky | G06F 21/44 |
| 2017/0042237 A1* | 2/2017 | Murison | H02J 7/00 |
| 2017/0042238 A1* | 2/2017 | Murison | F04B 49/06 |
| 2017/0042239 A1* | 2/2017 | Murison | F04B 49/06 |
| 2017/0042240 A1* | 2/2017 | Murison | F04B 45/047 |
| 2017/0042241 A1* | 2/2017 | Murison | B67D 7/78 |
| 2017/0043996 A1* | 2/2017 | Murison | A24F 47/008 |
| 2017/0043998 A1* | 2/2017 | Murison | H05B 1/0244 |
| 2017/0043999 A1* | 2/2017 | Murison | A61M 15/06 |
| 2017/0045150 A1* | 2/2017 | Marsh | A24F 40/485 |
| 2017/0048930 A1* | 2/2017 | Marsh | H02J 50/10 |
| 2017/0064997 A1* | 3/2017 | Murison | A61M 15/06 |

(56) References Cited

U.S. PATENT DOCUMENTS

| | | | |
|---|---|---|---|
| 2017/0093190 A1* | 3/2017 | Miller | H02J 7/0044 |
| 2017/0113865 A1* | 4/2017 | Swede | B65D 85/1045 |
| 2017/0207499 A1* | 7/2017 | Leadley | A24F 47/008 |
| 2017/0208865 A1* | 7/2017 | Nettenstrom | A24F 15/18 |
| 2017/0290372 A1* | 10/2017 | Hon | H02J 7/0045 |
| 2017/0366027 A9* | 12/2017 | Miller | H02J 7/0047 |
| 2018/0020727 A1* | 1/2018 | Hoffman | A24F 47/008 131/328 |
| 2018/0168234 A1* | 6/2018 | Hon | A24F 47/008 |
| 2018/0192706 A1* | 7/2018 | Hon | H02J 7/0045 |
| 2018/0192709 A1* | 7/2018 | Alarcon | A24F 47/00 |
| 2018/0279690 A1* | 10/2018 | Hon | A24F 40/40 |
| 2019/0021401 A1* | 1/2019 | Alarcon | H02J 7/0047 |
| 2019/0045845 A1* | 2/2019 | Hoffman | H02J 7/00 |
| 2019/0067970 A1* | 2/2019 | Alarcon | H02J 7/345 |
| 2019/0208811 A1* | 7/2019 | Biel | A24F 15/18 |
| 2019/0273383 A1* | 9/2019 | He | H02J 7/0013 |
| 2019/0289905 A1* | 9/2019 | Alarcon | A24F 9/16 |
| 2020/0000146 A1* | 1/2020 | Anderson | A24F 40/90 |
| 2020/0077700 A1* | 3/2020 | Alarcon | A24F 40/95 |
| 2020/0127480 A1* | 4/2020 | Wang | H02J 7/0042 |
| 2020/0196663 A1* | 6/2020 | Hon | A24F 47/008 |

* cited by examiner

PIVOTABLE CHARGING CASE FOR ELECTRONIC SMOKING DEVICE

BACKGROUND a. Field

The present invention relates generally to electronic smoking devices and in particular electronic cigarettes.

b. Background Art

An electronic smoking device, such as an electronic cigarette (or e-cigarette or eCig), typically has a housing accommodating an electric power source (e.g., a single use or rechargeable battery, electrical plug, or other power source), and an electrically operable atomizer. The atomizer vaporizes or atomizes liquid supplied from a reservoir and provides vaporized or atomized liquid as an aerosol. Control electronics control the activation of the atomizer. In some electronic cigarettes, an airflow sensor is provided within the electronic smoking device, which detects a user puffing on the device (e.g., by sensing an under-pressure or an airflow pattern through the device). The airflow sensor indicates or signals the puff to the control electronics to power up the device and generate vapor. In other e-cigarettes, a switch is used to power up the e-cigarette to generate a puff of vapor.

BRIEF SUMMARY

In accordance with one aspect of the present invention there is provided a charging case for an electronic smoking device comprising a container configured to house the electronic smoking device, a micro-control unit ("MCU"), wherein the MCU is coupled with the charging case and configured to facilitate charging a first rechargeable battery for the electronic smoking device, a plurality of connecting pins, where the connecting pins are coupled with the charging case and configured to facilitate electrical coupling between the electronic smoking device and the MCU; and a connector movably coupled with the charging case and configured to connect the MCU to external circuitry.

In accordance with another aspect of the present invention there is provided a system comprising an electronic smoking device comprising a battery, an eCig memory storing a first set of computer-readable instructions, and control electronics, and a charging case for an electronic smoking device comprising: a container configured to house the electronic smoking device, a micro-control unit ("MCU"), wherein the MCU is configured to facilitate charging the electronic smoking device, a connector, wherein the connector is movably coupled with the charging case and configured to connect to external circuitry; and a charging case battery, where the charging case battery is configured to charge the battery of the electronic smoking device.

The characteristics, features and advantages of these embodiments and the manner in which they are obtained as described above, will become more apparent and be more clearly understood in connection with the following description of exemplary embodiments, which are explained with reference to the accompanying drawings.

BRIEF DESCRIPTION OF THE DRAWINGS

In the drawings, the same element numbers indicate the same elements in each of the views.

DETAILED DESCRIPTION OF EMBODIMENTS

Figure 1:
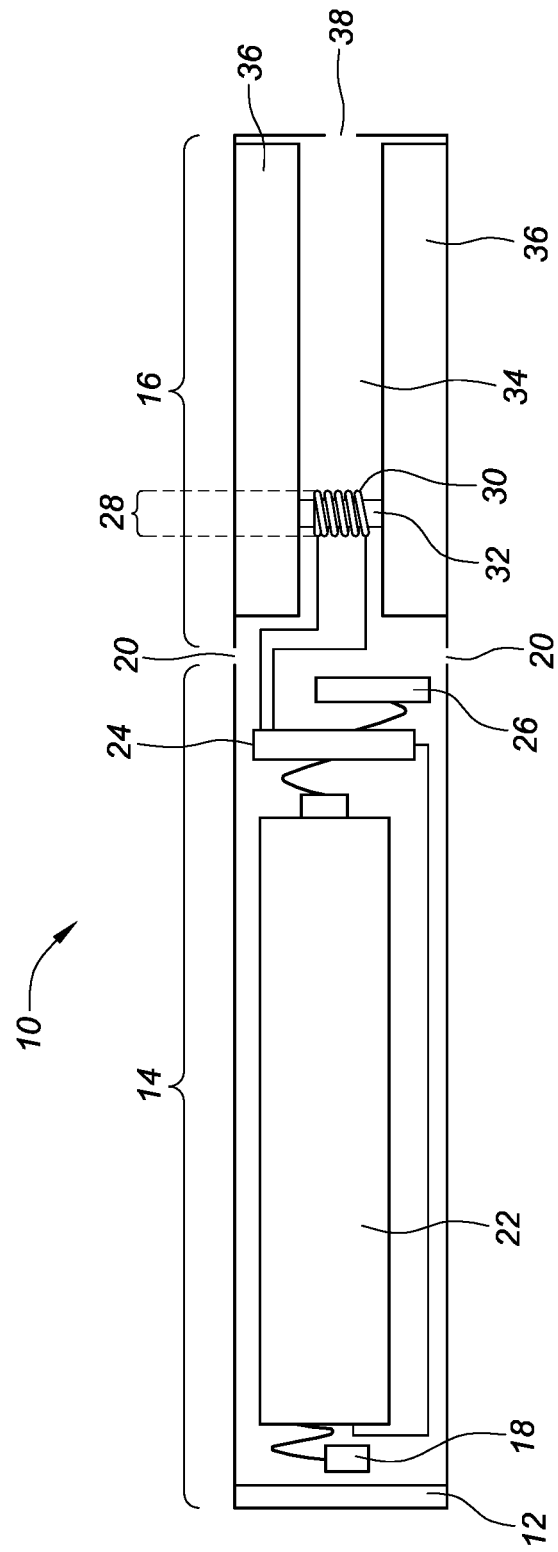
FIG. 1 is a schematic cross-sectional illustration of an exemplary e-cigarette.

Throughout the following, an electronic smoking device will be exemplarily described with reference to an e-cigarette. As is shown in FIG. 1, an e-cigarette 10 typically has a housing comprising a cylindrical hollow tube having an end cap 12. The cylindrical hollow tube may be a single-piece or a multiple-piece tube. In FIG. 1, the cylindrical hollow tube is shown as a two-piece structure having a power supply portion 14 and an atomizer/liquid reservoir portion 16. Together the power supply portion 14 and the atomizer/liquid reservoir portion 16 form a cylindrical tube which can be approximately the same size and shape as a conventional cigarette, typically about 100 mm with a 7.5 mm diameter, although lengths may range from 70 to 150 or 180 mm, and diameters from 5 to 28 mm.

The power supply portion 14 and atomizer/liquid reservoir portion 16 are typically made of metal (e.g., steel or aluminum, or of hardwearing plastic) and act together with the end cap 12 to provide a housing to contain the components of the e-cigarette 10. The power supply portion 14 and the atomizer/liquid reservoir portion 16 may be configured to fit together by, for example, a friction push fit, a snap fit, a bayonet attachment, a magnetic fit, or screw threads. The end cap 12 is provided at the front end of the power supply portion 14. The end cap 12 may be made from translucent plastic or other translucent material to allow a light-emitting diode (LED) 18 positioned near the end cap to emit light through the end cap 12. Alternatively, the end cap may be made of metal or other materials that do not allow light to pass.

An air inlet may be provided in the end cap 12, at the edge of the inlet next to the cylindrical hollow tube, anywhere along the length of the cylindrical hollow tube, or at the connection of the power supply portion 14 and the atomizer/liquid reservoir portion 16. FIG. 1 shows a pair of air inlets 20 provided at the intersection between the power supply portion 14 and the atomizer/liquid reservoir portion 16.

A power supply, preferably a battery 22, the LED 18, control electronics 24 and, optionally, an airflow sensor 26 are provided within the cylindrical hollow tube power supply portion 14. The battery 22 is electrically connected to the control electronics 24, which are electrically connected to the LED 18 and the airflow sensor 26. In this example, the LED 18 is at the front end of the power supply portion 14, adjacent to the end cap 12; and the control electronics 24 and airflow sensor 26 are provided in the central cavity at the other end of the battery 22 adjacent the atomizer/liquid reservoir portion 16.

The airflow sensor 26 acts as a puff detector, detecting a user puffing or sucking on the atomizer/liquid reservoir portion 16 of the e-cigarette 10. The airflow sensor 26 can be any suitable sensor for detecting changes in airflow or air pressure, such as a microphone switch including a deformable membrane which is caused to move by variations in air pressure. Alternatively, the sensor may be, for example, a Hall element or an electro-mechanical sensor.

The control electronics 24 are also connected to an atomizer 28. In the example shown, the atomizer 28 includes a heating coil 30 which is wrapped around a wick 32 extending across a central passage 34 of the atomizer/liquid reservoir portion 16. The central passage 34 may, for example, be defined by one or more walls of the liquid reservoir and/or one or more walls of the atomizer/liquid reservoir portion 16 of the e-cigarette 10. The coil 30 may be positioned anywhere in the atomizer 28 and may be transverse or parallel to a longitudinal axis of a cylindrical liquid reservoir 36. The wick 32 and heating coil 30 do not completely block the central passage 34. Rather an air gap is provided on either side of the heating coil 30 enabling air to flow past the heating coil 30 and the wick 32. The atomizer may alternatively use other forms of heating elements, such as ceramic heaters, or fiber or mesh material heaters. Nonresistance heating elements such as sonic, piezo, and jet spray may also be used in the atomizer in place of the heating coil.

The central passage 34 is surrounded by the cylindrical liquid reservoir 36 with the ends of the wick 32 abutting or extending into the liquid reservoir 36. The wick 32 may be a porous material such as a bundle of fiberglass fibers or cotton or bamboo yarn, with liquid in the liquid reservoir 36 drawn by capillary action from the ends of the wick 32 towards the central portion of the wick 32 encircled by the heating coil 30.

The liquid reservoir 36 may alternatively include wadding (not shown in FIG. 1) soaked in liquid which encircles the central passage 34 with the ends of the wick 32 abutting the wadding. In other embodiments, the liquid reservoir may comprise a toroidal cavity arranged to be filled with liquid and with the ends of the wick 32 extending into the toroidal cavity.

An air inhalation port 38 is provided at the back end of the atomizer/liquid reservoir portion 16 remote from the end cap 12. The inhalation port 38 may be formed from the cylindrical hollow tube atomizer/liquid reservoir portion 16 or may be formed in an end cap.

In use, a user sucks on the e-cigarette 10. This causes air to be drawn into the e-cigarette 10 via one or more air inlets, such as air inlets 20, and to be drawn through the central passage 34 towards the air inhalation port 38. The change in air pressure which arises is detected by the airflow sensor 26, which generates an electrical signal that is passed to the control electronics 24. In response to the signal, the control electronics 24 activate the heating coil 30, which causes liquid present in the wick 32 to be vaporized creating an aerosol (which may comprise gaseous and liquid components) within the central passage 34. As the user continues to suck on the e-cigarette 10, this aerosol is drawn through the central passage 34 and inhaled by the user. At the same time, the control electronics 24 also activate the LED 18 causing the LED 18 to light up, which is visible via the translucent end cap 12. Activation of the LED may mimic the appearance of a glowing ember at the end of a conventional cigarette. As liquid present in the wick 32 is converted into an aerosol, more liquid is drawn into the wick 32 from the liquid reservoir 36 by capillary action and thus is available to be converted into an aerosol through subsequent activation of the heating coil 30.

Some e-cigarette are intended to be disposable and the electric power in the battery 22 is intended to be sufficient to vaporize the liquid contained within the liquid reservoir 36, after which the e-cigarette 10 is thrown away. In other embodiments, the battery 22 is rechargeable and the liquid reservoir 36 is refillable and/or replaceable. In the cases where the liquid reservoir 36 is a toroidal cavity, this may be achieved by refilling the liquid reservoir 36 via a refill port (not shown in FIG. 1). In other embodiments, the atomizer/liquid reservoir portion 16 of the e-cigarette 10 is detachable from the power supply portion 14 and a new atomizer/liquid reservoir portion 16 can be fitted with a new liquid reservoir 36 thereby replenishing the supply of liquid. In some cases, replacing the liquid reservoir 36 may involve replacement of the heating coil 30 and the wick 32 along with the replacement of the liquid reservoir 36. A replaceable unit comprising the atomizer 28 and the liquid reservoir 36 may be referred to as a cartomizer.

The new liquid reservoir may be in the form of a cartridge (not shown in FIG. 1) defining a passage (or multiple passages) through which a user inhales aerosol. In other embodiments, the aerosol may flow around the exterior of the cartridge to the air inhalation port 38.

Of course, in addition to the above description of the structure and function of a typical e-cigarette 10, variations also exist. For example, the LED 18 may be omitted. The airflow sensor 26 may be placed, for example, adjacent to the end cap 12 rather than in the middle of the e-cigarette. The airflow sensor 26 may be replaced by, or supplemented with, a switch which enables a user to activate the e-cigarette manually rather than in response to the detection of a change in airflow or air pressure.

Different types of atomizers may be used. Thus, for example, the atomizer may have a heating coil in a cavity in the interior of a porous body soaked in liquid. In this design, aerosol is generated by evaporating the liquid within the porous body either by activation of the coil heating the porous body or alternatively by the heated air passing over or through the porous body. Alternatively the atomizer may use a piezoelectric atomizer to create an aerosol either in combination or in the absence of a heater.

Figure 2:
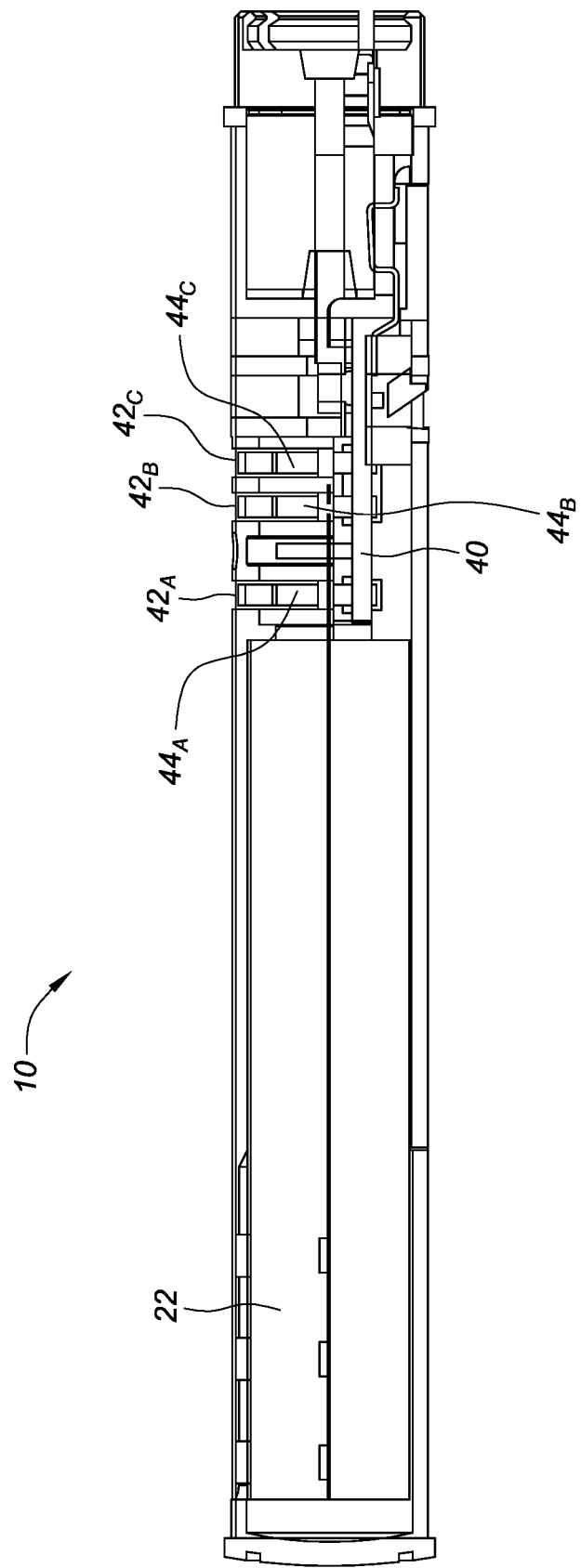
FIG. 2 is a cross-sectional side view of an e-cigarette, consistent with various aspects of the present disclosure.

FIG. 2 is a cross-sectional side view of an e-cigarette, consistent with various aspects of the present disclosure. As shown in FIG. 2, the e-cigarette 10 can include a battery 22 (e.g., a first battery) and a controller circuitry 40. Electrical contact apertures $42_{A-C}$ can be located on the e-cigarette 10. Electrical contacts or connectors $44_{A-C}$ can be electrically coupled with the controller circuitry 40, and extend through at least a portion of the electrical contact apertures $42_{A-C}$. As discussed in more detail below, the electrical connectors $44_{A-C}$ facilitate electrical communication between the controller circuitry 40 and external circuitry, as well as charging of the battery 22 by transmitting a current to the battery 22 from an external power source (e.g., external battery, charger, electronic device, among others).

The e-cigarette 10 can utilize software, hardware, firmware, and/or logic to perform a number of functions described herein. The e-cigarette 10 can include a combination of hardware and instructions to share information. The hardware, for example can include the controller circuitry 40 and/or a memory (not shown) (e.g., an eCig memory, a non-transitory computer-readable medium (CRM) database, etc.). The memory, as used herein, can include a number of processors capable of executing instructions stored by the memory resource. The memory can be integrated in a single device or distributed across multiple devices. The instructions (e.g., computer-readable instructions) can include instructions stored on the memory and executable by the memory for providing control over the e-cigarette 10 and/or performing various steps. Additional details regarding various exemplary control steps of the electronic cigarette 10 can be found in U.S. patent application Ser. No. 15/219,195, filed 25 Jul. 2016, which is hereby incorporated by reference as if set forth fully herein.

Figure 3:
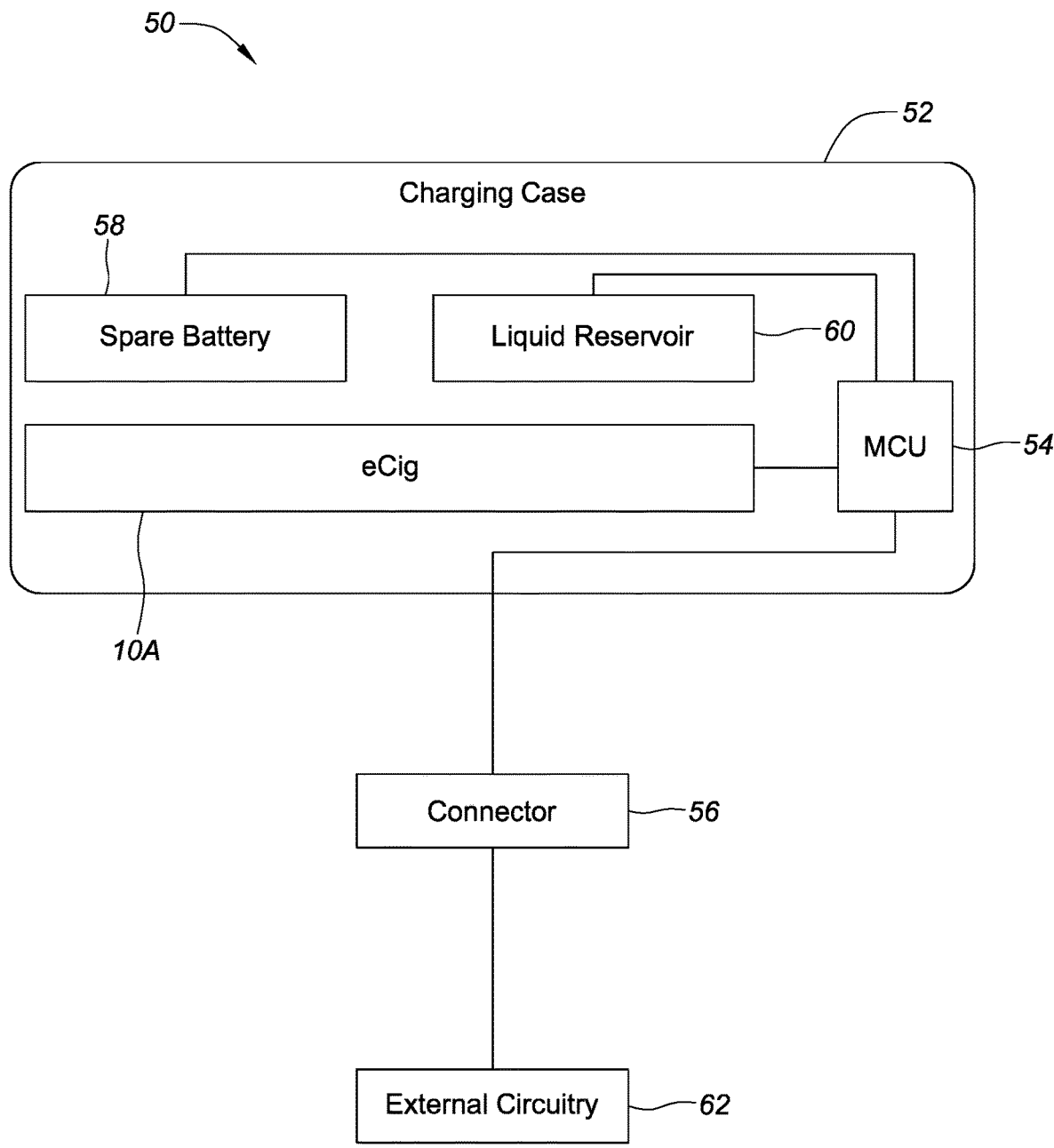
FIG. 3 is a schematic diagram of a system including charging case for charging a battery of an e-cigarette with a micro-control unit or a mobile computing unit (MCU) and a connector connected to external circuitry, consistent with various aspects of the present disclosure.

FIG. 3 is a schematic diagram of a system including charging case for charging a battery of an e-cigarette with a micro-control unit or a mobile computing unit (MCU) and a connector connected to external circuitry, consistent with various aspects of the present disclosure. A charging case system 50 can include a charging case 52 (e.g., a container) that can include an MCU 54 and a connector 56. The MCU 54 and the connector 56 can be electrically coupled. The charging case 52 can also be configured to house, for example, one or more of an electronic cigarette 10A, a spare battery 58 (e.g., a second battery) for an electronic cigarette 10A, and a liquid reservoir 60 for the electronic cigarette 10A. The electronic cigarette 10A, the spare battery 58 for the electronic cigarette 10A, and/or the liquid reservoir 60 can be electrically coupled with the MCU 54 when coupled with the charging case 52. The connector 56 can be configured to connect with external circuitry 62.

The MCU 54 can comprise a programmable microprocessor or microcontroller or may comprise an application specific integrated circuit (ASIC). The MCU 54 may include a central processing unit (CPU) and an input/output (I/O) interface through which MCU 54 may receive a plurality of input signals including signals generated by the electronic cigarette 10, the spare battery 58, the liquid reservoir 60, and/or the external circuitry 62. The MCU 54 can generate a plurality of output signals including those used to control and/or provide data to the electronic cigarette 10, the spare battery 58, the liquid reservoir 60, and/or the external circuitry 62. The MCU 54 can be used to control, for example, communication between the charging case 52, the electronic cigarette 10A, the spare battery 58, the liquid reservoir 60, and/or external circuitry 62. The external circuitry 62 can include, for example, wired connections (e.g., through the connector 56 to networks (e.g., server-based network, LAN, WAN, Internet, intranet, Wi-Fi network, Bluetooth network, cellular network and/or the like)).

The charging case 52 can facilitate charging of the battery (e.g., the battery 22/the first battery, a rechargeable battery) of the electronic cigarette 10A. The battery can be integrated into the electronic cigarette 10A (e.g., fixed, and not removable) or the battery can be separate from the electronic cigarette 10A (e.g., a removable battery that is coupled with the electronic cigarette 10A and can be replaced as needed such as the battery 58/the second battery). The connector 56 can be connected to external circuitry 62, such as a computer (though a Universal Serial Bus (USB) connection), a wall outlet, another battery, etc. The electronic cigarette 10A can be electrically coupled with the charging case 52 and the connector 56 can provide power, through the MCU 54, to the battery (e.g., the battery 22 and/or the battery 58) of the electronic cigarette 10A. The MCU 54 can, for example, control and/or regulate the flow of power to the battery (e.g., the battery 22 and/or the battery 58). See incorporated U.S. patent application Ser. No. 15/219,195, filed 25 Jul. 2016, for additional information about charging.

Figure 4A:
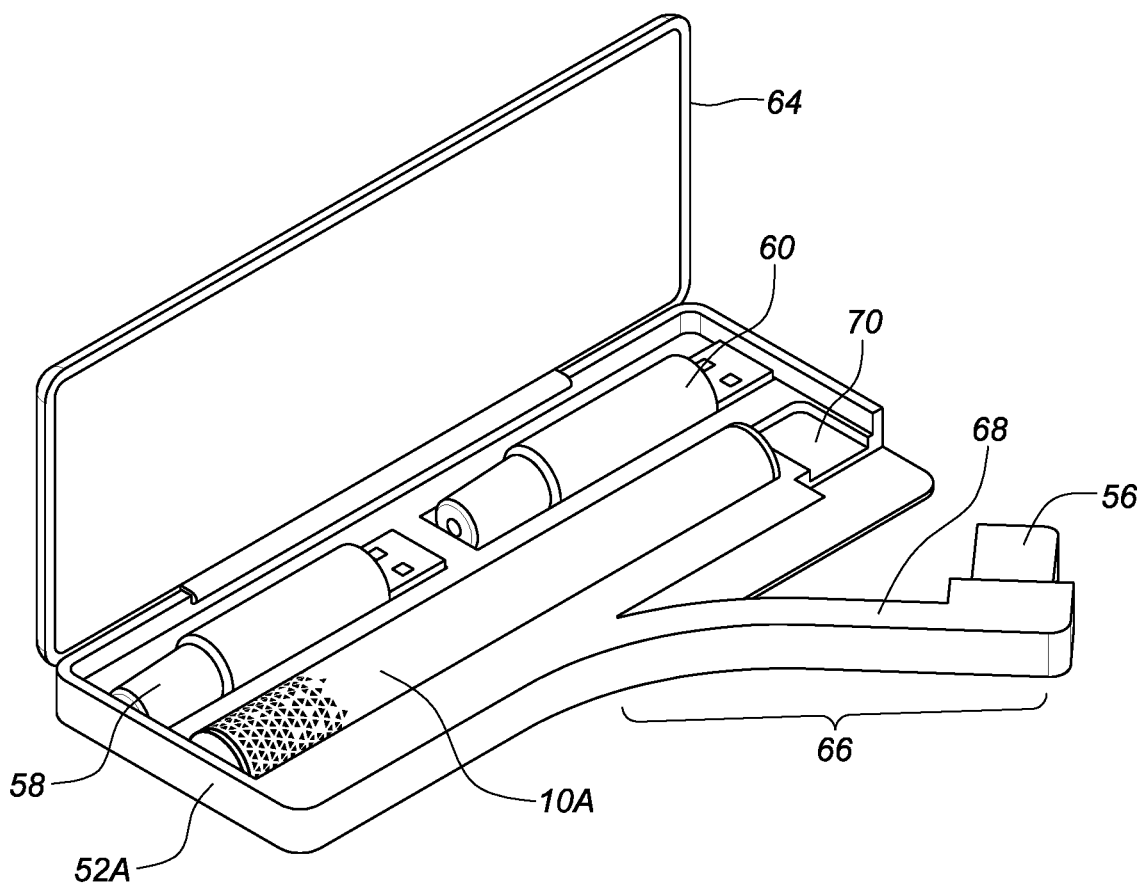
FIG. 4A is an isometric side, top, and front view of a charging case for the e-cigarette shown in FIG. 2 with a portion of the charging case in an open position, consistent with various aspects of the present disclosure.
Figure 4B:
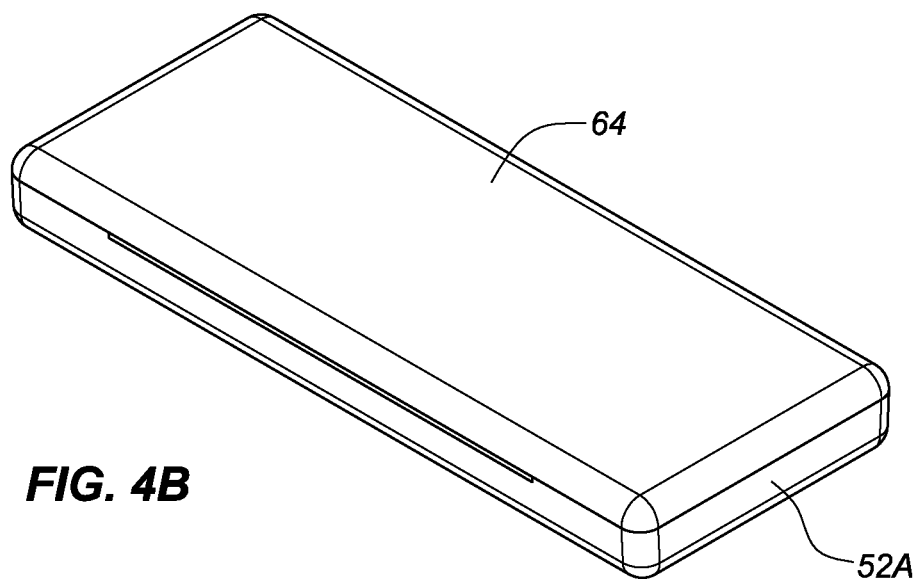
FIG. 4B is a side, top, and front view of the charging case shown in FIG. 4A, with the portion of the charging case in a closed position, consistent with various aspects of the present disclosure.

FIGS. 4A-B show exemplary embodiments of the charging case for charging the battery of the e-cigarette described in FIG. 3. FIG. 4A is an isometric side, top, and front view of a charging case for the e-cigarette shown in FIG. 2 with a portion of the charging case in an open position, consistent with various aspects of the present disclosure. FIG. 4B is a side, top, and front view of the charging case shown in FIG. 4A, with the portion of the charging case in a closed position, consistent with various aspects of the present disclosure.

Turning to FIG. 4A, the charging case 52A can be configured to house an electronic cigarette 10A. The electronic cigarette 10A can be coupled with a portion of the charging case 52A. The charging case 52A can also house the battery 58 (e.g., a spare battery), and/or a liquid reservoir 60 (e.g., a spare liquid reservoir). Other embodiments of the charging case (not shown) could house one electronic cigarette, or the electronic cigarette and one liquid reservoir (e.g., the liquid reservoir 60), or the electronic cigarette and one spare battery (e.g., the battery 58), or the electronic cigarette and multiple liquid reservoirs and/or multiple spare batteries, and/or one or more mouthpiece tips, or other accessories or parts for the electronic cigarette. Any combination of the previous items (e.g., liquid reservoir, spare battery, mouthpiece tip, and/or other accessory) is also possible.

The charging case 52A can include a plurality of connecting pins (not shown), where the plurality of connecting pins can be configured to electrically connect to, for example, the plurality of connectors $44_{A-C}$ in the e-cigarette 10A (see also e-cigarette 10 in FIG. 2 and discussion above). The charging case 52A can have, for example, three connecting pins. The number of connectors $44_{A-C}$/connecting pins can range from, for example, 2-20. In some embodiments the connecting pins can have a round cross-section and be cylindrically shaped. Other embodiments can use different sizes or shapes for the connecting pins (e.g., one round, one square, smaller or larger diameter and/or length, etc.) to aid with the desired configuration of the connection between the e-cigarette 10 and the charging case 52A. Some embodiments can have a one-to-one ratio of connectors $44_{A-C}$ to connecting pins (e.g., the same number of connectors $44_{A-C}$ and connecting pins) while other embodiments can have different numbers of connectors $44_{A-C}$ and connecting pins (e.g., 4 connectors and 3 connecting pins, etc.).

The three connecting pins can be used to connect with the corresponding connectors $44_{A-C}$ in the e-cigarette 10A for charging the battery 22 and/or the battery 58 and to facilitate signals or messages between the e-cigarette 10 and the charging case 52A. For example, a first connecting pin (not shown) can be connected to a ground and a second connecting pin (not shown) can be used for transmitting current to a charging circuit, and a third connecting pin (not shown) can be used for sending a transmission of one or more signals or messages from the charging case 52A to the e-cigarette 10 (e.g., sending a charge message, or a disconnect message, etc.). The second connecting pin can, in some embodiments, be used by the e-cigarette 10 to receive a signal or transmission from the charging case when the e-cigarette 10 is in the communication mode (and not in the charging mode). The signal going through the second connecting pin can be, for example, a high or a low signal. In some embodiments, the high and/or low signals can be used to trigger a switch between modes (exemplary modes are described in greater detail in the incorporated U.S. patent application Ser. No. 15/219,195, filed 25 Jul. 2016, referenced above).

In other embodiments, the arrangement/order of the connectors/connecting pins can be varied (e.g., connector $44_A$ and the first connecting pin are ground, connector $44_B$ and the second connecting pin are hot, connector $44_C$ and the third connecting pin/$48_C$ are for sending/receiving, or connector $44_A$ is hot, connector $44_B$ and the second connecting pin are ground, and connector $44_C$ the third connecting pin are for sending/receiving, etc.). Additional connectors/connecting pins could be used (e.g., four connectors/connecting pins) to permit dedicated paths for sending and receiving signals. However, due to space constraints, a single connector that alternates between acting as the path that can send and receive signals can reduce the size of space needed in the e-cigarette 10 for the connectors.

The connectors/connecting pins can also be arranged in a configuration to prevent reversing a connection between the e-cigarette 10 and the charging case 52A. For example, the spacing of the connectors/connecting pins can vary so that the charging case only connects to the e-cigarette 10A in one configuration. For example, a distance between the first and the second connectors can be different from the distance between second and the third connectors. Other embodiments can use different sizes and/or different shapes for the connectors/connecting pins (e.g., one round, one square, etc.) to aid with the desired configuration of the connection between the e-cigarette 10 and the charging case 52.

The charging case 52A can include a portion 64 (e.g., a lid or a cover), where the portion 64 is movable to, for example, permit the charging case 52A to be in an open position (shown in FIG. 4A). The open position of the charging case 52A can facilitate access to and placing and removing the electronic cigarette 10A from the charging case 52A (e.g., access for a user to place the electronic cigarette 10A in the charging case 52A/remove the electronic cigarette 10 from the charging case 52A). The open position can also facilitate placement and removal of additional items for the electronic cigarette 10. For example, additional battery packs, liquid tanks, mouthpiece tips, or other items and/or accessories for the electronic cigarette 10 can be stored in the charging case 52A and accessed when the charging case 52A is in an open position.

As shown in FIG. 4A, the charging case 52A can include a movable member 66 that includes the connector 56, where the movable member 66 is movably coupled with the charging case 52A. For example, the connector 56 can be coupled to the charging case 52A by a flexible element 68. The flexible element 68 can have a first position (e.g., an "open" or "extended" position shown in FIG. 4A) and a second position (e.g., a "closed" or "retracted" position shown in FIG. 4B and described further below).

The flexible element 68 can be made from a material that is pliable (e.g., a polymer, a wire, etc.). The flexible element 68 can be integral to the charging case 52A as shown in FIG. 4A. In other embodiments, the flexible element can be a separate element from the charging case and coupled with the charging case (not shown). The pliability of flexible element 68 can allow the connector 56 to be accessed for connection to external circuitry (e.g., external circuitry 62).

In another embodiment, the connector 56 can be movably coupled with the charging case 52A by a rigid element (not shown). The rigid element can, for example, pivot or slide from a first position to a second position. In still another embodiment the rigid element can, for example, be deployed by a spring or other similar device that could cause the rigid element to "pop out" or similarly deploy (e.g., from a closed to an open position or from a stored to a useable position). This action could be triggered by a release button or other similar feature. Similar to above, the first position can be an "open" or "extended" position and the second position can be a "closed" or "retracted" position.

The flexible element 68 can have a first position and a second position. The first position (e.g., a deployed position) can be where the connector 56 of flexible element 68 is positioned to allow connection of the connector 56 to external circuitry (e.g., connecting the connector 56 to external circuitry 62, such as a computer or other device). The second position can be where the connector 56 of the flexible element 68 is positioned to make the connector 56 recessed (e.g., protected, hidden, stored, etc.) into the charging case 52A. For example, the connector 56 can be stowed in a recessed portion 70 of the charger case 52A, see FIG. 4B) when not needed and/or in use. The recessed portion 70 can be shaped to accept the connector 56 and/or couple with a portion of the connector 56 to keep the connector 56 in place against the charging case 52A when not being used.

The flexible element 68 can include a flexible circuit or, alternatively, wires (not shown), where the flexible circuit connects the connector 56 and, for example, the MCU 54. The flexible circuit can be surrounded by a flexible material. The flexible material can be sufficiently flexible to allow for the connector 56 to be positioned to connect with external circuitry (e.g., external circuitry 62). In some embodiments, the flexible material can be configured to cause the flexible element 68 to have a positional memory, where the positional memory causes the flexible element 68 to return to a position. For example, the flexible element 68 can be biased to return to a closed position (e.g., the connector 56 is coupled with the recessed portion 70 of the charging case 52A) after being in an open position (e.g., where the flexible element 68 is manually moved away from the recessed portion 70 of the charging case 52A).

The connector 56 can be any suitable type of connector for connecting the charging case 56 to external circuitry. For example, the connector 56 can be a USB connector configured to connect with a computer, a charging apparatus, a mobile device (e.g., a mobile phone), or other similar devices.

As shown in FIG. 4B, the charging case 52A of FIG. 4A can have the portion 64 in a closed position. The closed position can occur when the portion 64 (e.g., the lid or the cover) is moved to cover the e-cigarette 10A and any other accessories (e.g., liquid reservoirs, spare batteries, etc.).

The electronic cigarette 10A, when housed in the charging case 52A, can be charged with the charging case 52A in either the open or the closed positions. The closed position can, for example, protect the electronic cigarette 10A and any accessories and/or items stored in the charging case 52A (e.g., additional battery packs, liquid tanks, and/or mouthpiece tips, etc.).

Figure 5A:
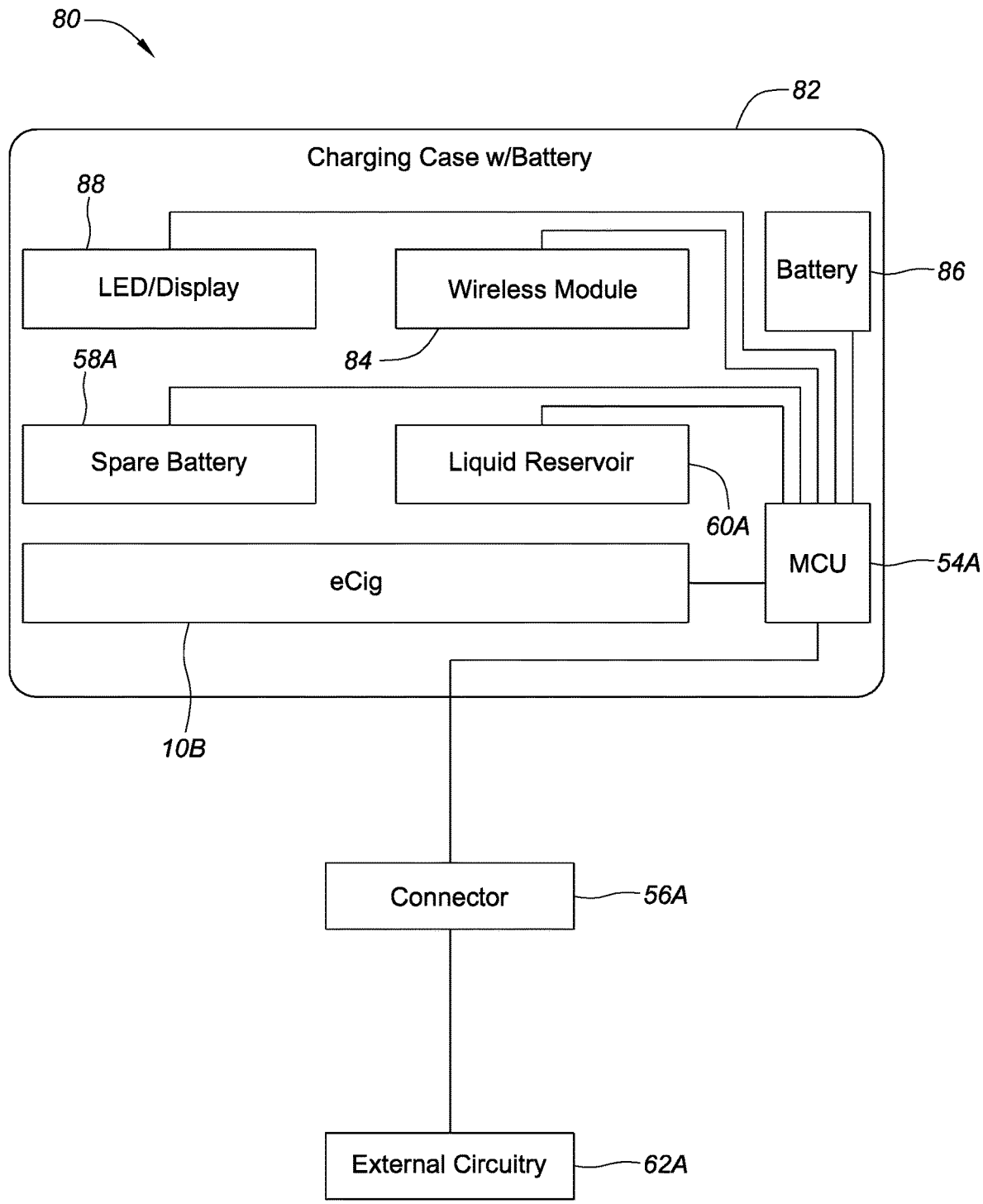
FIG. 5A is a schematic diagram of a system including a charging case for charging a battery of an e-cigarette, where the charging case includes a rechargeable battery, an MCU, and a wireless module, consistent with various aspects of the present disclosure.

FIG. 5A is a schematic diagram of a system including a charging case for charging a battery of an e-cigarette (e.g. the battery 22 and/or the battery 58), where the charging case includes a battery (e.g., a charging case battery, which may be rechargeable), an MCU, and a wireless module, consistent with various aspects of the present disclosure. A charging case system 80 can include a charging case 82 (e.g., a container) that can include an MCU 54A. The MCU 54A can be electrically connected with a wireless module 84 (e.g., a wireless communication module such as a Bluetooth module) to facilitate wireless communication between the charging case 82, an electronic cigarette 10B, and/or external circuitry 62A). The MCU 54A can comprise a programmable microprocessor or microcontroller or may comprise an application specific integrated circuit (ASIC). The MCU 54 may include a central processing unit (CPU) and an input/output (I/O) interface through which MCU 54 may receive a plurality of input signals including signals generated by the electronic cigarette 10, the spare battery 58, the liquid reservoir 60, and/or the external circuitry 62. The MCU 54 can generate a plurality of output signals including those used to control and/or provide data to the electronic cigarette 10, the spare battery 58, the liquid reservoir 60, and/or the external circuitry 62.

The charging case 82 can also include a connector 56A. The MCU 54A and the connector 56A can be electrically coupled. The charging case 82 can also include a battery 86 coupled with the charging case 82 (e.g., integrated to the charging case, built into the charging case, etc.). The charging case 82 can also be configured to couple with one or more of the electronic cigarette 10B (including a battery (e.g., a first battery (not shown)), a battery 58A (a spare battery) for the electronic cigarette 10B (e.g., a second battery), and a liquid reservoir 60A for the electronic cigarette 10B.

The charging case 82 can facilitate charging of a battery (e.g., the battery 22 and/or the battery 58A) of the electronic cigarette 10B. The battery can be integrated into the electronic cigarette 10B (e.g., fixed, and not removable) and/or the battery can be separate from the electronic cigarette 10B (e.g., a removable battery that is coupled with the electronic cigarette 10B and can be replaced as needed, such as the battery 58A/the second battery). The connector 56A can be connected to external circuitry 62A, such as a computer (though a USB connection), a wall outlet, another battery, etc. The electronic cigarette 10B can be electrically coupled with the charging case 82 and the connector 56A can provide power, through the MCU, to the battery (e.g., the battery 22 and/or the battery 58A) of the electronic cigarette 10B. The battery can be electrically connected to, for example, connecting pins (not shown) that electrically couple the electronic cigarette 10C with the charging case 92. The MCU 54A can, for example, control and/or regulate the flow of power to the battery (e.g., the battery 22 and/or the battery 58A). See incorporated U.S. patent application Ser. No. 15/219,195, filed 25 Jul. 2016, for additional information about charging of the electronic cigarette.

The charging case 82 can also include a charge indicator 88. The charge indicator 88 can be, for example, one or more lights (e.g., LEDs) or a display (e.g., an LCD). The charge indicator 88 can indicate, for example, the level of charge of the battery 86 (e.g., a percentage of charge remaining, an amount of operation time remaining, a number of puffs remaining for a current liquid reservoir, etc.), the number of (full) charges remaining (e.g., the number of times the battery 86 can charge the battery 22 and/or the battery 58A), etc. For example, the charge indicator 88 can include a light for each full charge remaining (e.g., five of five lights illuminated indicates five full charges available, four of five lights illuminated indicates four full charges available, etc.). In other embodiments, the charge indicator 88 lights can represent a portion of the battery charge remaining (e.g., four of the five lights indicates 80% of battery capacity remains, three of the five lights indicates 60% of battery capacity remains, etc.). In some embodiments a display (not shown) can display a number representing the number of full charges remaining (e.g., a "4" indicates four full charges available, a "3" indicates three full charges available, etc.) or the amount of battery charge remaining (e.g., "100" for a full battery with 100% charge remaining, "80" for 80% charge remaining, etc.).

In some embodiments the charge indicator 88 can be used to present information to a user. For example, errors with the charging case 82 could be represented by a pattern of flashing lights (e.g., LED) and/or a message on a display (e.g., an LCD). In the embodiment with a display, other messages could be shown in the display (e.g., marketing information, refill/replacement information, etc.). Additional information regarding this can be found in PCT application WO 2015/051376, "Retail Engine for Electronic Smoking Device" filed on 6 Oct. 2014 and is hereby incorporated by reference as if set forth fully herein.

Figure 5B:
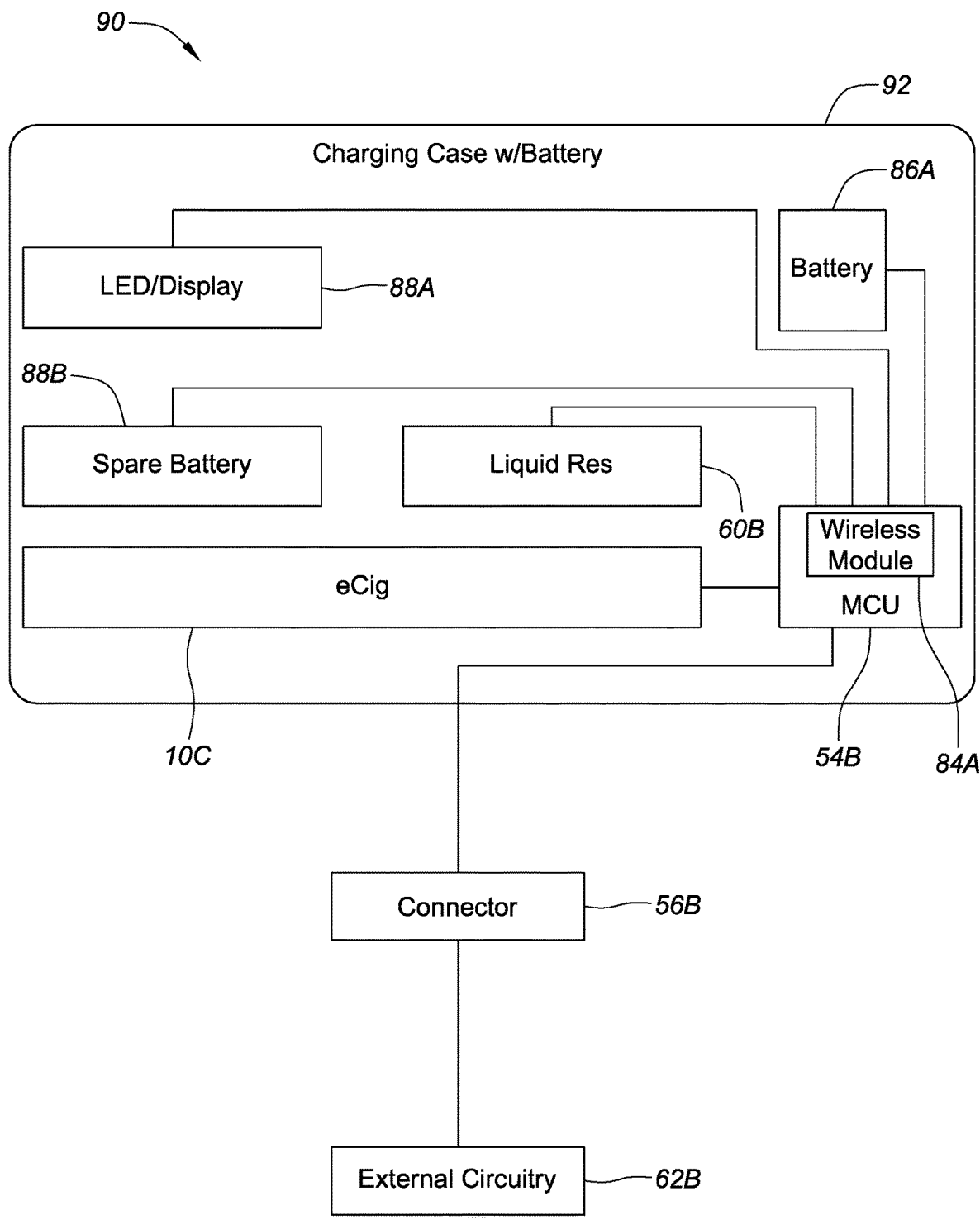
FIG. 5B is a schematic diagram of a system including a charging case for charging a battery of an e-cigarette, where the charging case includes a rechargeable battery, an MCU with an integrated wireless module, consistent with various aspects of the present disclosure.

FIG. 5B is a schematic diagram of a system including a charging case for charging a battery of an e-cigarette, where the charging case includes a battery, an MCU with an integrated wireless module, consistent with various aspects of the present disclosure. Similar to FIG. 5A, a charging case system 90 can include a charging case 92 that includes an MCU 54B with an integrated wireless module 84B. The MCU 54B can comprise a programmable microprocessor or microcontroller or may comprise an application specific integrated circuit (ASIC). The MCU 54 may include a central processing unit (CPU) and an input/output (I/O) interface through which MCU 54 may receive a plurality of input signals including signals generated by the electronic cigarette 10, the spare battery 58, the liquid reservoir 60, and/or the external circuitry 62. The MCU 54 can generate a plurality of output signals including those used to control and/or provide data to the electronic cigarette 10, the spare battery 58, the liquid reservoir 60, and/or the external circuitry 62. The charging case 92 can also include a connector 56B. The MCU 54B and the connector 56B can be electrically coupled. The charging case 92 can also be configured to couple with one or more of an electronic cigarette 10C, a spare battery 58B for the electronic cigarette 10C, and a liquid reservoir 60B for the electronic cigarette 10C.

The charging case 92 can facilitate charging of a battery (e.g., the battery 22 and/or the battery 58B) of the electronic cigarette 10C. The battery (e.g., the battery 22 and/or the battery 58B) can be integrated into the electronic cigarette 10C (e.g., fixed, and not removable) or the battery can be separate from the electronic cigarette 10C (e.g., a removable battery that is coupled with the electronic cigarette 10C and can be replaced as needed, such as the battery 58B/the second battery). The connector 56B can be connected to external circuitry 62B, such as a computer (though a USB connection), a wall outlet, another battery, etc. The electronic cigarette 10C can be electrically coupled with the charging case 92 and the connector 56B can provide power, through the MCU, to the battery (e.g., the battery 22 and/or the battery 58B) of the electronic cigarette 10C. The battery can be electrically connected to, for example, connecting pins (not shown) that electrically couple the electronic cigarette 10C with the charging case 92. The MCU 54B can, for example, control and/or regulate the flow of power to the battery (e.g., the battery 22 and/or the battery 58B). See incorporated U.S. patent application Ser. No. 15/219,195, filed 25 Jul. 2016, for additional information about charging.

The charging case 92 can also include a charge indicator 88A. The charge indicator 88A can be, for example, one or more lights (e.g., LEDs) or a display (e.g., an LCD). The charge indicator 88A can indicate, for example, the level of charge of the battery 86A (e.g., a percentage of charge remaining, an amount of operation time remaining, a number of puffs remaining for a current liquid reservoir, etc.), the number of (full) charges remaining (e.g., the number of times the battery 86A can charge the battery 22 and/or the battery 58B), etc. For example, the charge indicator 88A can include a light for each full charge remaining (e.g., five of five lights illuminated indicates five full charges available, four of five lights illuminated indicates four full charges available, etc.). In other embodiments, the charge indicator 88A can represent a portion of the battery charge remaining (e.g., four of the five lights may indicate that 80% of battery capacity remains, three of the five lights indicates 60% of battery capacity remains, etc.). In some embodiments a display (not shown) can display a number representing the number of full charges remaining (e.g., a "4" may indicate that four full charges are available, a "3" indicates three full charges available, etc.) or the amount of battery charge remaining (e.g., "100" for a full battery with 100% charge remaining, "80" for 80% charge remaining, etc.).

Figure 6A:
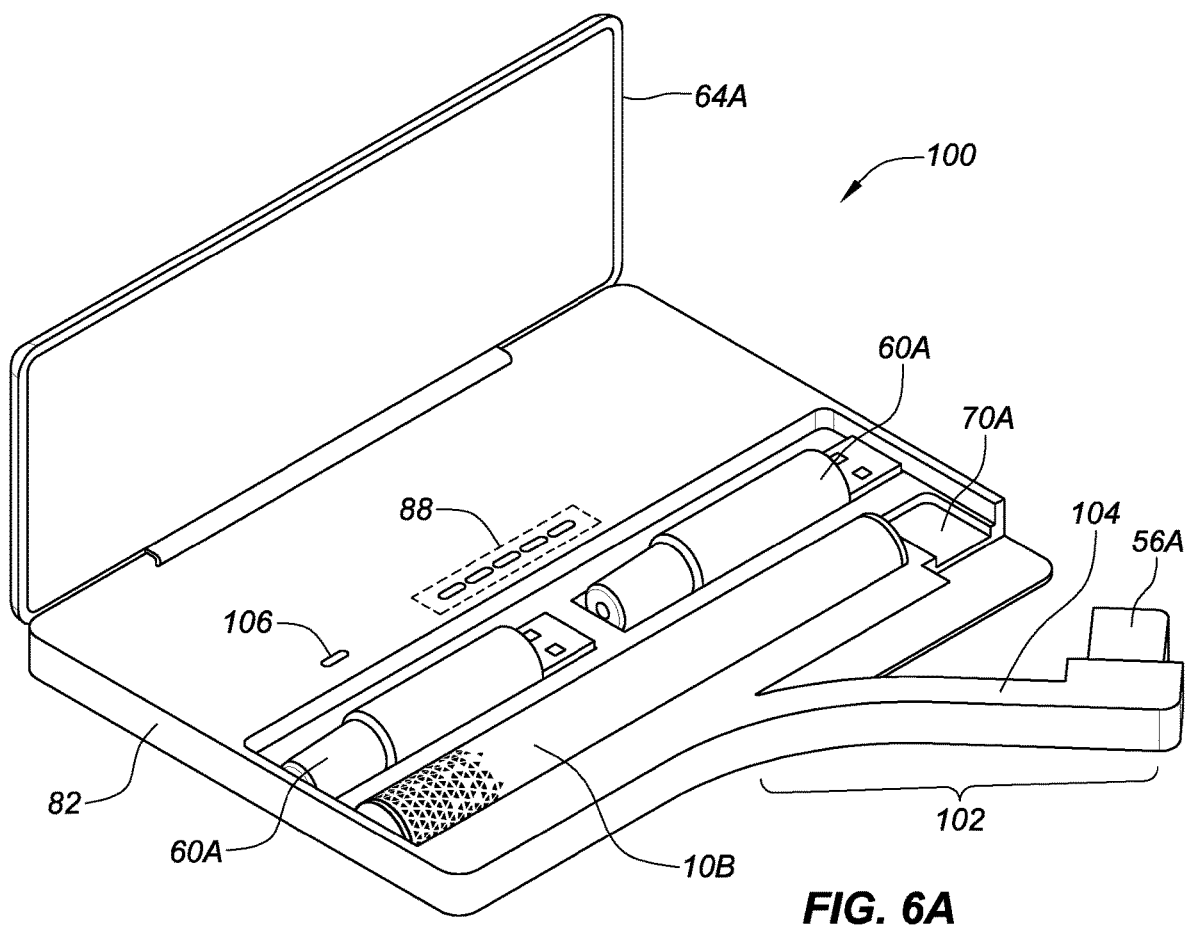
FIG. 6A is a side, top, and front view of a charging case with a battery, consistent with various aspects of the present disclosure.

FIG. 6A is a side, top, and front view of a charging case with a battery, consistent with various aspects of the present disclosure. A charging case system 100 can include the charging case 82. The charging case 82 can include a connector 56A and a rechargeable battery (not shown), where the connector 56A is movably coupled with the charging case 82

Similar to FIG. 4A above, FIG. 6A shows the charging case 82 can include a movable member 102 that includes the connector 56A, where the movable member 102 is movably coupled with the charging case 82. For example, the connector 56A can be coupled to the charging case 82 by a flexible element 104. The flexible element 104 can have a first position (e.g., an "open" or "extended" position shown in FIG. 6A) and a second position (e.g., a "closed" or "retracted" position shown in FIG. 6B and described further below).

The flexible element 104 can be made from a material that is pliable (e.g., a polymer). The flexible element 104 can be integral to the charging case 82 as shown in FIG. 6A. In other embodiments, the flexible element can be a separate element from the charging case and coupled with the charging case (not shown). The pliability of flexible element 104 can allow the connector 56A to be accessed for connection to external circuitry (e.g., external circuitry 62A).

In another embodiment, the connector 56A can be movably coupled with the charging case 82 by a rigid element (not shown). The rigid element can, for example, pivot or slide from a first position to a second position. Similar to above, the first position can be an "open" or "extended" position and the second position can be a "closed" or "retracted" position.

Other embodiments with the connector 56A are possible. As mentioned above, t the rigid element can, for example, be deployed by a spring or other similar device that could cause the rigid element to "pop out" or similarly deploy in a rotating or sliding/extending manner (e.g., from a closed to an open position or from a stored to a useable position). This action could be triggered by, for example, a release button or by manually pulling on an element on a portion of the rigid element and/or connector 56A to deploy, open, or extend the rigid element.

The flexible element 104 can have a first position and a second position. The first position (e.g., a deployed position) can be where a connector 56A is positioned to allow connection of the connector 56A to external circuitry (e.g., connecting the connector 56 to external circuitry 62A, such as a computer or other device). The second position can be where the connector 56A of the flexible element 104 is positioned to make the connector 56A recessed (e.g., protected, hidden, stored, etc.) into the charging case 82. For example, the connector 56A can be stowed in a recessed portion 70A of the charger case 82, see FIG. 6B) when not needed and/or in use. The recessed portion 70A can be shaped to couple with a portion of the connector 56A to keep the connector 56A in place against the charging case 82 when not being used.

The flexible element 104 can include a flexible circuit (not shown), where the flexible circuit connects the connector 56A and, for example, the MCU 54A. The flexible circuit can be surrounded by a flexible material. The flexible material can be sufficiently flexible to allow for the connector 56A to be positioned to connect with external circuitry (e.g., external circuitry 62A). In some embodiments, the flexible material can be configured to cause the flexible element 104 to have a positional memory, where the positional memory causes the flexible element 104 to return to a position. For example, the flexible element 104 can be biased to return to a closed position (e.g., the connector 56A is coupled with the recessed portion 70A of the charging case 82) after being in an open position (e.g., where the flexible element 104 is manually moved away from the recessed portion 70A of the charging case 82).

The connector 56A can be any suitable type of connector for connecting the charging case 56A to external circuitry (e.g., external circuitry 62A). For example, the connector 56A can be a USB connector configured to connect with a computer, a charging apparatus, a mobile device (e.g., a mobile phone), or other similar devices.

The charging case 82 can also include a charge indicator 88A. The charge indicator 88A can be, for example, one or more lights (e.g., LEDs) or a display (e.g., an LCD). The charge indicator 88A can indicate, for example, the level of charge of the rechargeable battery, the number of (full) charges remaining (e.g., the number of times the battery 86 can charge the battery 22 and/or the battery 58A), etc. For example, the charge indicator 88A can include a light for each full charge remaining (e.g., five of five lights illuminated indicates five full charges available, four of five lights illuminated indicates four full charges available, etc.). In other embodiments, the charge indicator lights can represent a portion of the battery charge remaining (e.g., four of the five lights indicates 80% of battery capacity remains, three of the five lights indicates 60% of battery capacity remains, etc.). In some embodiments a display (not shown) can display a number representing the number of full charges remaining (e.g., a "4" indicates four full charges available, a "3" indicates three full charges available, etc.) or the amount of battery charge remaining (e.g., "100" for a full battery with 100% charge remaining, "80" for 80% charge remaining, etc.).

The charging case 82 can also include a charging status indicator 106. The charging status indicator 106 can indicate that the charging case battery (e.g., rechargeable battery 86) is being charged (e.g., the charging case 82 is connected to external circuitry (e.g., external circuitry 62A) that is providing power to charge the charging case battery (e.g., rechargeable battery 86) and/or that the charging case 82 is charging the rechargeable battery (e.g., battery 22) of the electronic cigarette 10B. The charging status indicator can be, for example, an LED light that is "on" (e.g., on continuously or flashing) when the charging case 82 is connected to an external power source (e.g., connector 56A is connected to external circuitry 62A) and/or charging the rechargeable battery (e.g., battery 22) of the electronic cigarette 10B and "off" when the charging case 82 is not connected to an external power source and/or not charging the rechargeable battery (e.g., battery 22) of the electronic cigarette 10B.

In some embodiments, the charging case 82 can include a button (not shown). The button can be located at any suitable location on the charging case (e.g., on the exterior or the interior) and accessible by a user. The button can be coupled with a switch (not shown) located inside the charging case 82. The switch can be electrically coupled with the MCU 54A. Using the MCU 54A when connected to the external circuitry 62A, the switch can be configured to trigger an action by the MCU 54. For example, the switch can be configured to trigger an order of an item (e.g., a liquid reservoir) from a retailer, a web site, a company, etc.) by causing the MCU 54A to, for example, send a signal to a computer (see discussion related to FIG. 8 below for additional information). Additional discussion regarding exchanges between a user, via the electronic cigarette 10, and/or a computer (e.g., a mobile phone) and communication networks can be found in the incorporated U.S. patent application Ser. No. 15/219,195, filed 25 Jul. 2016.

The charging case 82 can include a portion 64A (e.g., a lid or a cover), where the portion 64A is movable to, for example, permit the charging case 82 to be in an open position (shown in FIG. 6A). The open position of the charging case 82 can facilitate access to and placing and removing the electronic cigarette 10B from the charging case 82 (e.g., access for a user to place the electronic cigarette 10B in the charging case 82/remove the electronic cigarette 10B from the charging case 82). The open position can also facilitate placement and removal of additional items for the electronic cigarette 10B. For example, additional battery packs, liquid tanks, mouthpiece tips, or other items and/or accessories for the electronic cigarette 10B can be stored in the charging case 82 and accessed when the charging case 82 is in an open position.

Figure 6B:
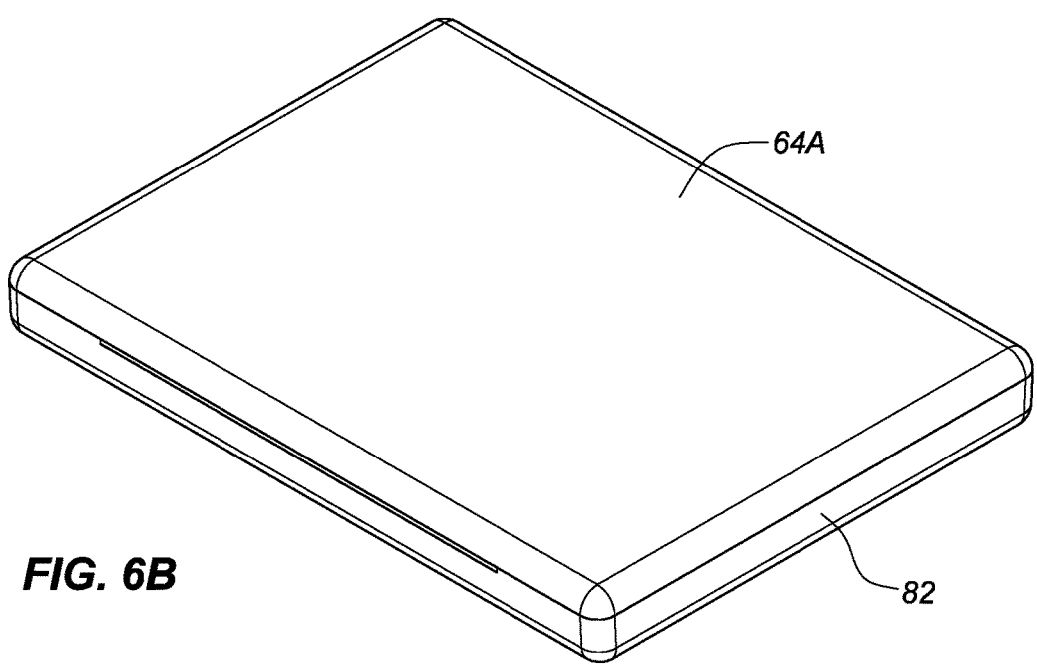
FIG. 6B is a side, top, and front view of the charging case with the battery of FIG. 6A, consistent with various aspects of the present disclosure.

FIG. 6B is a side, top, and front view of the charging case with the battery of FIG. 6A, consistent with various aspects of the present disclosure. FIG. 6B shows the charging case 82 of FIG. 6A in a closed position. Similar to FIG. 4B above, the closed position can occur when the portion 64A (e.g., the lid) is moved cover the e-cigarette 10A and any other accessories (e.g., liquid reservoirs, spare batteries, etc.). The electronic cigarette 10B, when coupled with the charging case 82, can be charged with the charging case 82 in either the open or the closed positions.

Figure 7A:
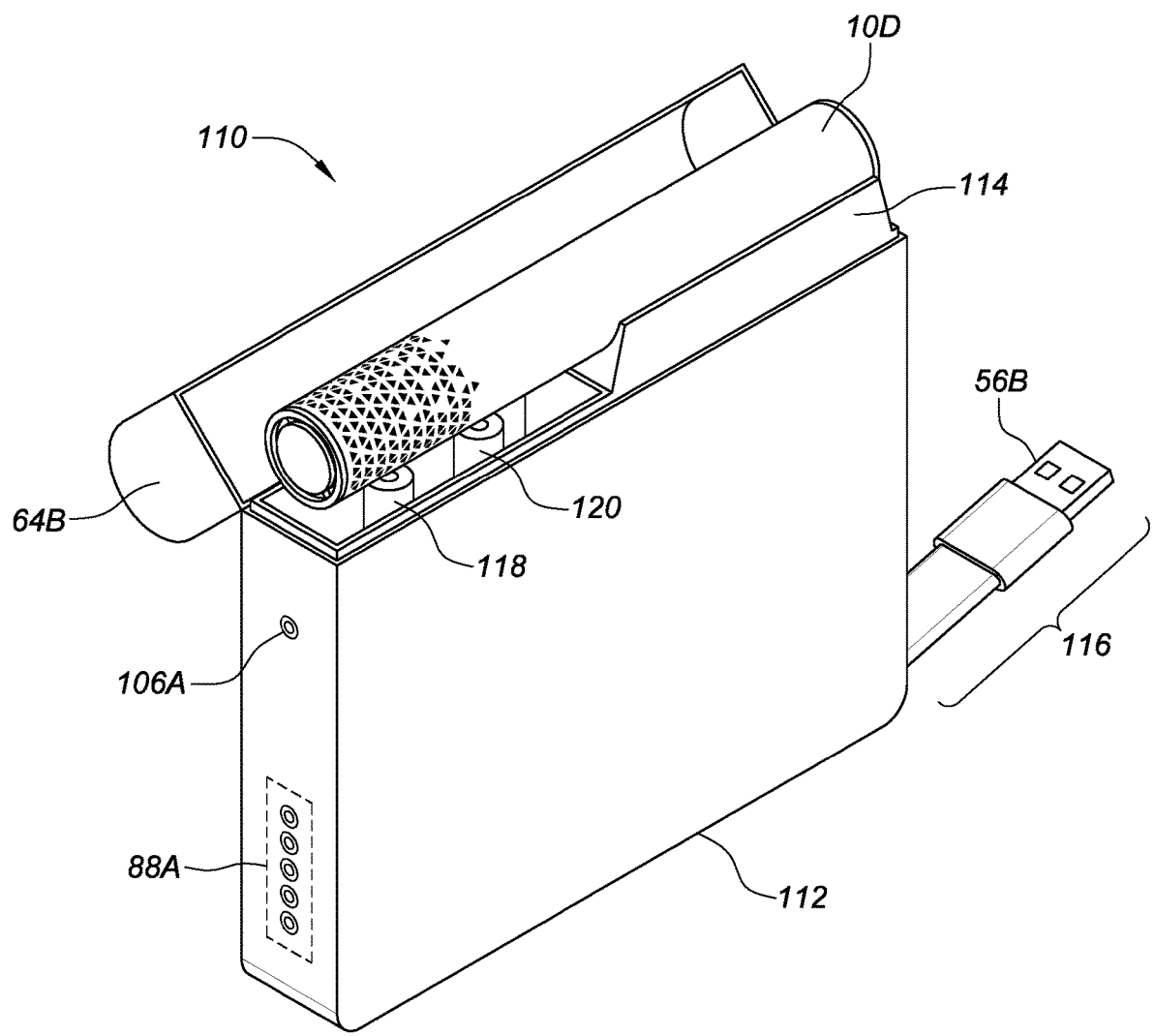
FIG. 7A is a side, top, and front view of a charging case with a battery, consistent with various aspects of the present disclosure.

FIG. 7A is a side, top, and front view of a charging case with a battery, consistent with various aspects of the present disclosure. The charging case 112 (i.e., charging stand, desktop stand, desk stand; desktop charger) can include a holder 114 for coupling an electronic cigarette 10D with the charging case 112. The holder 114 can position the electronic cigarette 10D in a horizontal position that can, for example, allow the electronic cigarette 10D to be stored inside the charging case 112 (e.g., during travel, when not in use, etc.) and electrically coupled with a rechargeable battery (not shown in FIG. 7A).

Similar to FIG. 6A above, FIG. 7A shows an embodiment a system 110 including the charging case 112 that includes a connector 56B and a rechargeable battery (not shown), where the connector 56B is movably coupled with the charging case 112. Similar to FIGS. 4A and 6A above, the connector 56B can be a movable member 116 that is movably coupled to the charging case 112 (e.g., by a pivoting connection/member, a flexible element/member, etc.). The movability of the movable member 116 and connector 56B can allow the connector 56B to be accessed for connection to external circuitry similar to discussions herein. The charging case 112 can also include connectors 118 and 120 (discussed in greater detail below, see FIG. 7B).

The connector 56B can have a first position and a second position. The first position (e.g., a deployed position, see FIG. 7A) can be where a connector 56B is positioned to allow connection of the connector 56B to external circuitry (e.g., external circuitry 62A). The second position can be where the connector 56B is positioned to make the connector 56B recessed (e.g., protected, hidden, stored, etc.) into the charging case 112 (e.g., the connector 56B is stowed in a portion of the charging case 112, see FIG. 7B) when not needed and/or in use. The movable member 116 can be moved in any suitable way, including, for example, pivoting the movable member (e.g., at a pivot point that allows the movable member to rotate from the first position to the second position) or sliding the movable member 116 (e.g., a linear movement of the movable member 116 from the first position to the second position). Another embodiment (not shown) could have the connector 56B with or without the movable member 116 where a flexible connector (e.g., a wire) is stored inside the charging case 112. For example, the flexible connector could be coupled with a spool that includes a spring mechanism that allows the connector 56B to extend and retract as needed.

The charging case 112 can include a battery (not shown in FIG. 4A). The charging case battery can be electrically connected to, for example, connecting pins (not shown) that electrically couple the electronic cigarette 10D with the charging case 112. The electronic cigarette 10D can have its rechargeable battery (e.g., battery 22) recharged by the charging case battery (e.g., rechargeable battery 86). The recharging process can be controlled by the MCU 54A. (See incorporated U.S. patent application Ser. No. 15/219,195, filed 25 Jul. 2016, for more information about the recharging process with respect to connections between the MCU 54A and the electronic cigarette 10D).

The charging case 112 can also include a charge indicator 88A. The charge indicator 88A can be, for example, one or more lights (e.g., LEDs) or a display (e.g., an LCD). The charge indicator 88A can indicate, for example, the level of charge of the rechargeable battery, the number of (full) charges remaining, etc. For example, the charge indicator 88A can include a light for each full charge remaining (e.g., four of four lights illuminated indicates four full charges available, three of four lights illuminated indicates three full charges available, etc.). In other embodiments, the charge indicator 88A lights can represent a portion of the battery charge remaining (e.g., four of the five lights indicates 80% of battery capacity remains, three of the five lights indicates 60% of battery capacity remains, etc.). In some embodiments a display (not shown) can display a number representing the number of full charges remaining (e.g., a "5" indicates five full charges available, a "4" indicates four full charges available, etc.) or the amount of battery charge remaining (e.g., "100" for a full battery with 100% charge remaining, "80" for 80% charge remaining, etc.).

In some embodiments, the charging case 112 can include a location to store an accessory or part for the electronic cigarette 10D (not shown). For example, the charging case 112 can include an opening that would allow storage of a spare rechargeable battery, a liquid reservoir, and/or a mouthpiece or similar item for the electronic cigarette 10D. The storage location can be accessed when a portion of the charging case 64A (e.g., a lid, flap, or cover) is in an open position to facilitate access to the electronic cigarette 10D.

Figure 7B:
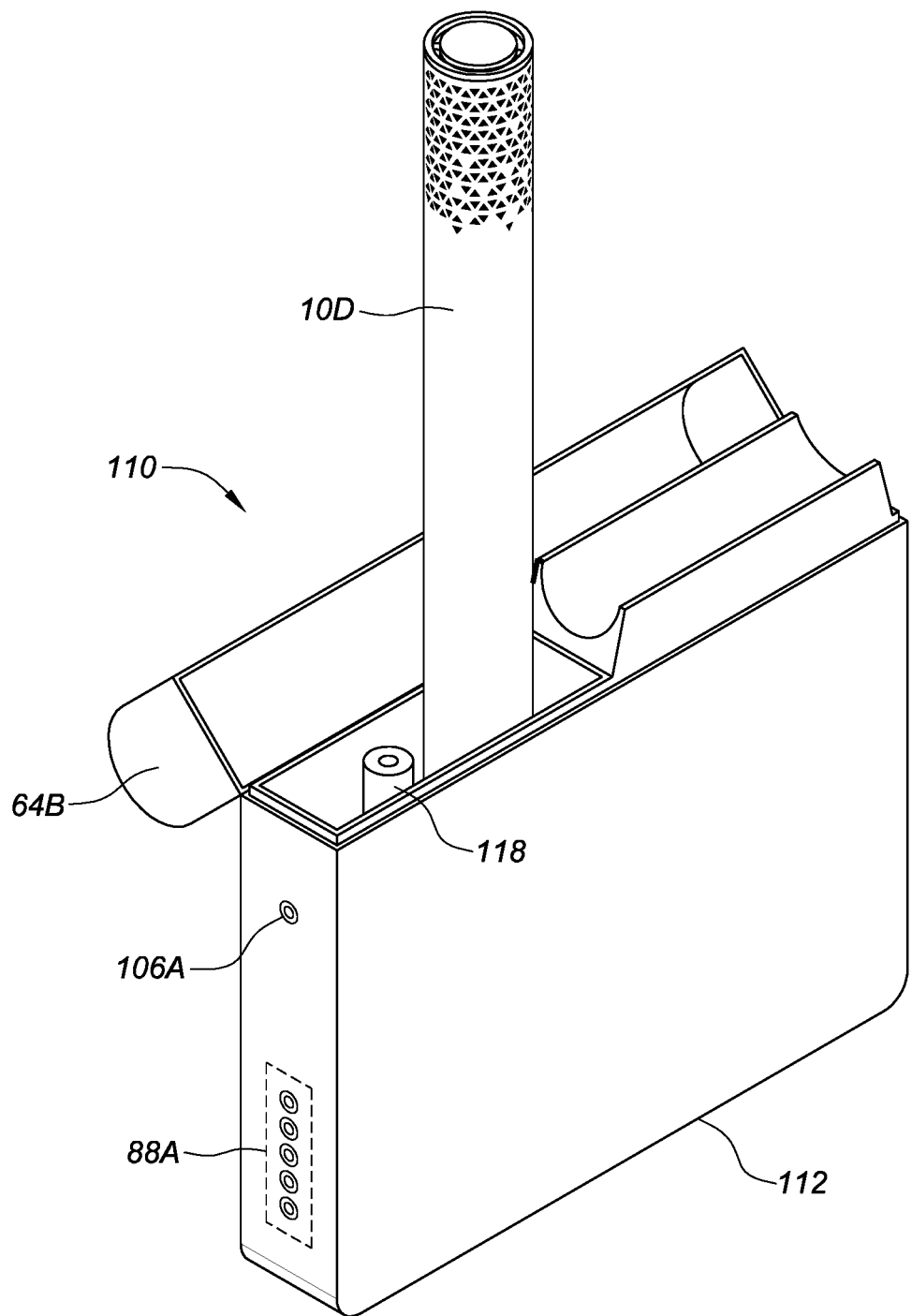
FIG. 7B is a side, top, and front view of the charging case with the battery of FIG. 7A with an electronic cigarette in an accessible charging position, consistent with various aspects of the present disclosure.

FIG. 7B is a side, top, and front view of the charging case with the battery of FIG. 7A with an electronic cigarette in an accessible charging position, consistent with various aspects of the present disclosure. In addition to the stowed position described above and shown in FIG. 7B above, the electronic cigarette 10D can also be coupled with the charging case 112 in an accessible position. The accessible position can allow a user to, for example, more easily access the electronic cigarette 10D. For example, the user may use the electronic cigarette 10D, then couple the electronic cigarette 10D with the charging case 112 by placing the electronic cigarette 10 in the accessible position.

The accessible position allows the electronic cigarette 10D to electrically couple with the charging case 112 via connectors 118 and 120 (120 is hidden from view in FIG. 7B) and to hold the electronic cigarette 10D in an accessible position (e.g., a vertical position with respect to the charging case 112). The charging case 112 can include more than one connectors 116 and 118. As shown in FIG. 7B, there can be, for example, two connectors 118 and 120, where the electronic cigarette 10D is coupled with connector 120.

Figure 7C:
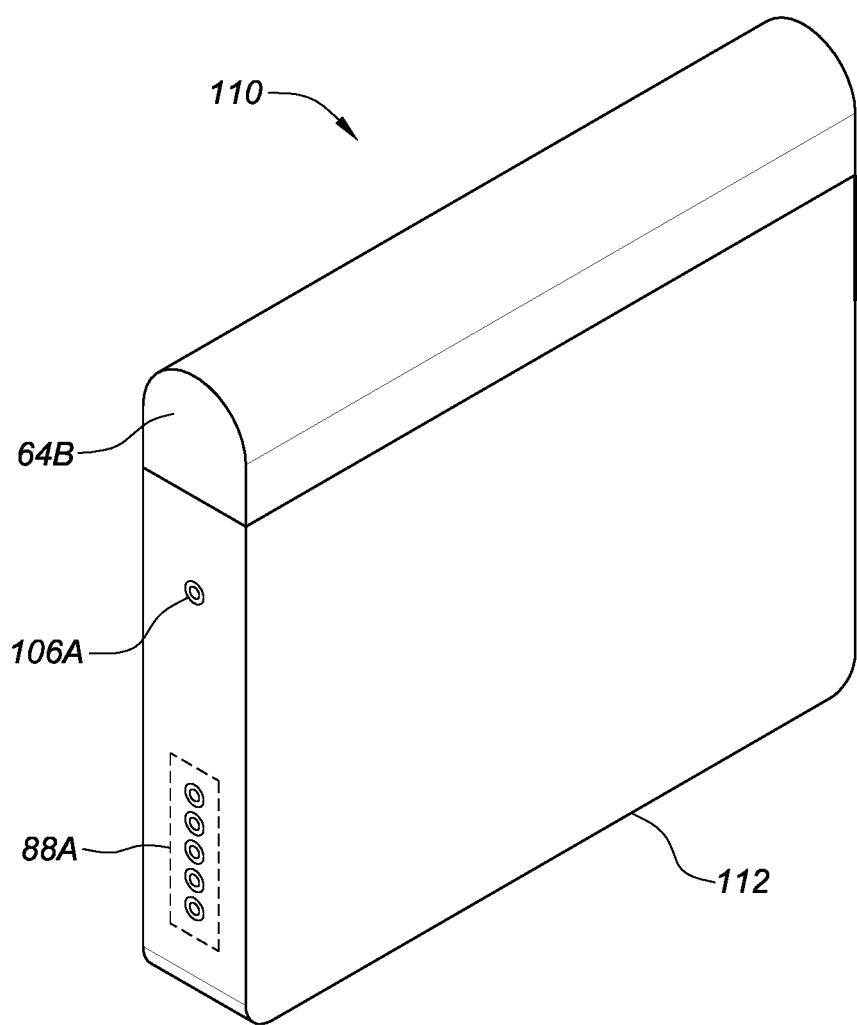
FIG. 7C is a side, top, and front view of the charging case with a battery of FIG. 7A with the charging case in a closed position, consistent with various aspects of the present disclosure.

FIG. 7C is a side, top, and front view of the charging case with a battery of FIG. 7A with the charging case in a closed position, consistent with various aspects of the present disclosure. Similar to FIG. 4B above, the charging case 112 can be in a closed position when the portion 64A (e.g., the lid) is moved cover the e-cigarette 10D and any other accessories (e.g., liquid reservoirs, spare batteries, etc.) as shown in FIG. 7C. The electronic cigarette 10D, when coupled with the charging case 112, can be charged with the portion 64B the charging case 112 in either the open or the closed positions (e.g., see the position of the electronic cigarette 10D in FIGS. 7A and 7B).

Figure 8A:
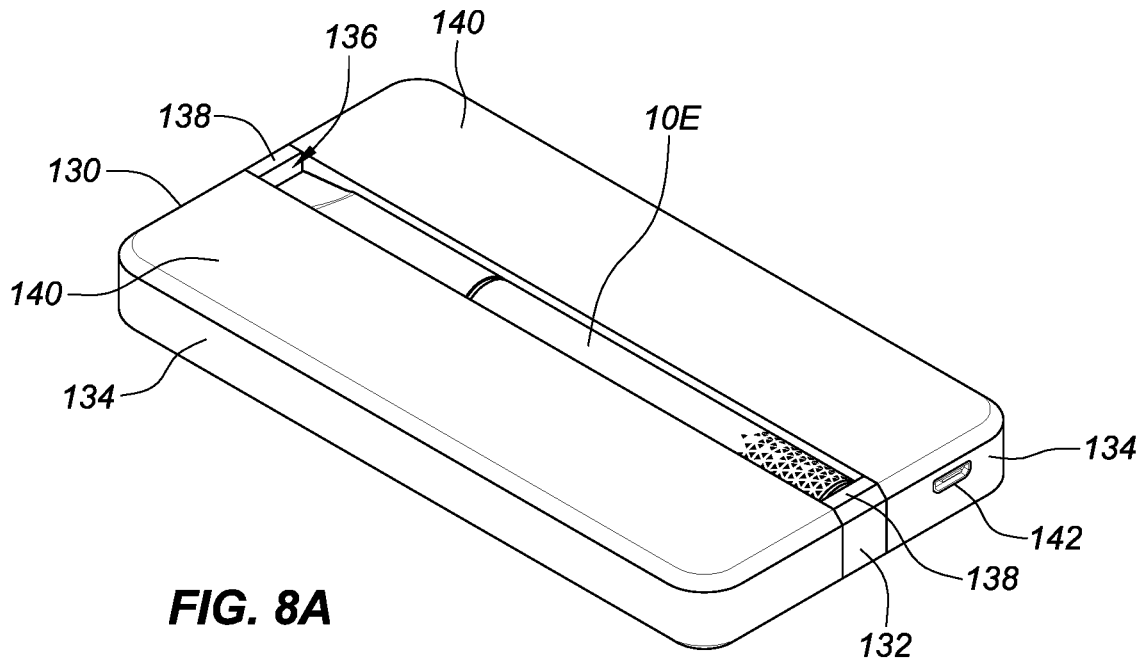
FIG. 8A is a side, top, and end view of a charging case with a battery, consistent with various aspects of the present disclosure.

FIG. 8A is a side, top, and end view of a charging case with a battery, consistent with various aspects of the present disclosure. The charging case 130 (i.e., charging stand, desktop stand, desk stand; desktop charger) can comprise a central frame element 132 pivotally coupled with two wing elements 134. The central frame element 132 can include a holder 136 for holding an electronic cigarette 10E and coupling the electronic cigarette 10E with the charging case 130. The holder 136 can position the electronic cigarette 10E in a position that can, for example, allow the electronic cigarette 10E to be stored inside the charging case 132 (e.g., during travel, when not in use, etc.) and electrically coupled with a rechargeable battery (not shown in FIG. 8A).

The wing elements 134 can pivot about a portion of the central frame element 132. When the wing elements 134 are in a first position, a first central frame element surface 138 of the central frame element 132 can align with a first wing element surface 140. The first position can allow a portion of the electronic cigarette 10E to be visible (e.g., not hidden by the central frame element 132 and/or the wing elements 134). In some embodiments (not shown), the wing elements can completely cover the electronic cigarette 10E in the first position (e.g., the electronic cigarette is hidden from view).

The charging case 130 can be configured in a manner similar to the schematic shown in FIG. 5A or 5B. One of the wing elements 134 can include a battery (i.e., a charging case battery, not visible in FIG. 8A) to charge the electronic cigarette 10E. The wing element 134 containing the charging case battery can also include a connector 142 that is electrically coupled with the charging case battery to electrically couple the charging case 130 with external circuitry as described herein. The charging case battery (e.g., battery 86 of FIG. 5) can also be electrically connected to, for example, connecting pins (not shown) that electrically couple the electronic cigarette 10E with the charging case 130. The electronic cigarette 10E can have its rechargeable battery (e.g., battery 22 of FIG. 1) recharged by the charging case battery (e.g., rechargeable battery 86 of FIG. 5A). The recharging process can be controlled by an MCU (e.g., MCU 54A. (See incorporated U.S. patent application Ser. No. 15/219,195, filed 25 Jul. 2016, for more information about the recharging process with respect to connections between the MCU 54A and the electronic cigarette 10E).

The charging case 130 can also include a charge indicator as described herein (not shown in FIG. 8A; see, e.g., charge indicator 88A in FIGS. 7A-B). The charge indicator can be, for example, one or more lights (e.g., LEDs) or a display (e.g., an LCD) similar to the charge indicators 88 and/or 88A (of FIGS. 5A B, 7A-B). The charge indicator can indicate, for example, the level of charge of the rechargeable battery, the number of (full) charges remaining, etc. For example, the charge indicator can include a light for each full charge remaining (e.g., four of four lights illuminated indicates four full charges available, three of four lights illuminated indicates three full charges available, etc.). In other embodiments, the charge indicator lights can represent a portion of the battery charge remaining (e.g., four of the five lights indicates 80% of battery capacity remains, three of the five lights indicates 60% of battery capacity remains, etc.). In some embodiments a display (not shown) can display a number representing the number of full charges remaining (e.g., a "5" indicates five full charges available, a "4" indicates four full charges available, etc.) or the amount of battery charge remaining (e.g., "100" for a full battery with 100% charge remaining, "80" for 80% charge remaining, etc.).

In some embodiments the charge indicator of the charging case 130 (not shown in FIG. 8A) can be used to present information to a user. For example, errors with the charging case 130 could be represented by a pattern of flashing lights (e.g., LED) and/or a message on a display (e.g., an LCD). In the embodiment with a display, other messages could be shown in the display (e.g., marketing information, refill/replacement information, etc.). Additional information regarding this can be found in PCT application WO 2015/051376, "Retail Engine for Electronic Smoking Device" filed on 6 Oct. 2014 and is hereby incorporated by reference as if set forth fully herein.

Figure 8B:
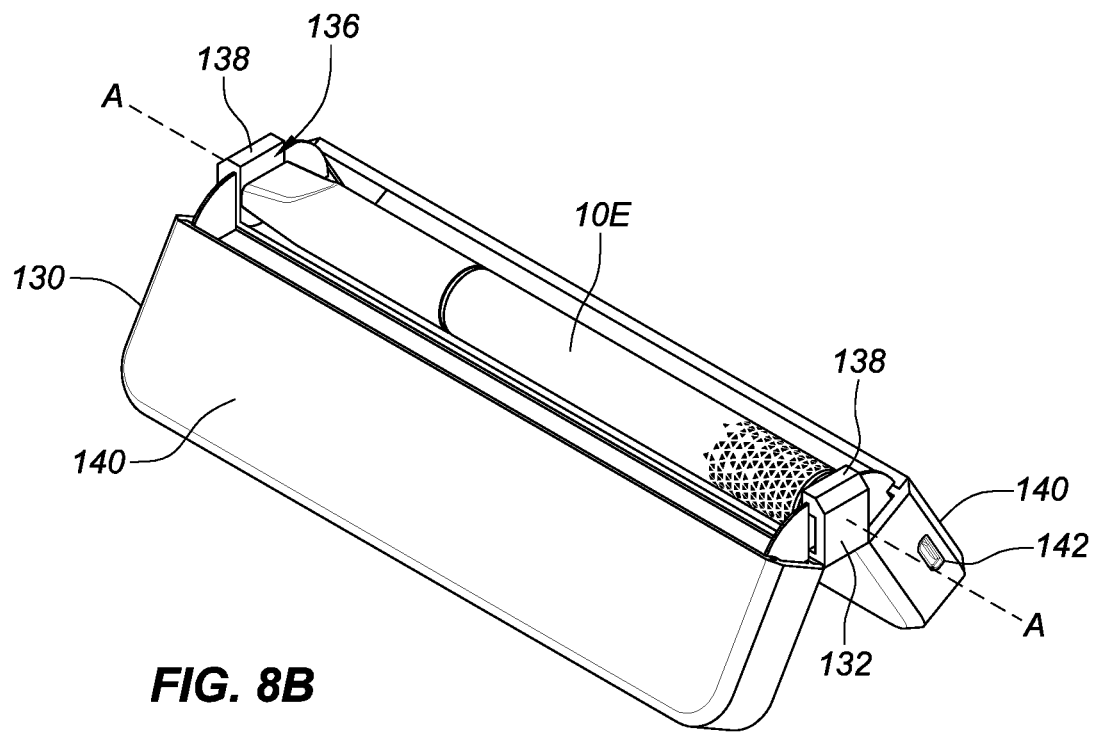
FIG. 8B is a side, top, and end view of the charging case of FIG. 8A showing the case in an open position, consistent with various aspects of the present disclosure.

FIG. 8B is a side, top, and end view of the charging case of FIG. 8A showing the case in an open position, consistent with various aspects of the present disclosure. The central frame element 132 of the charging case 130 can have a longitudinal axis represented by the line A-A that aligns with a longitudinal axis of the electronic cigarette 10E. As shown in FIG. 8B, each of the wing elements 134 can pivot with respect to the central frame element 132 to from an open position for the charging case 130. The open position can allow a user to access the electronic cigarette 10E (e.g., remove/insert the electronic cigarette 10E with respect to the holder 136.

Figure 8C:
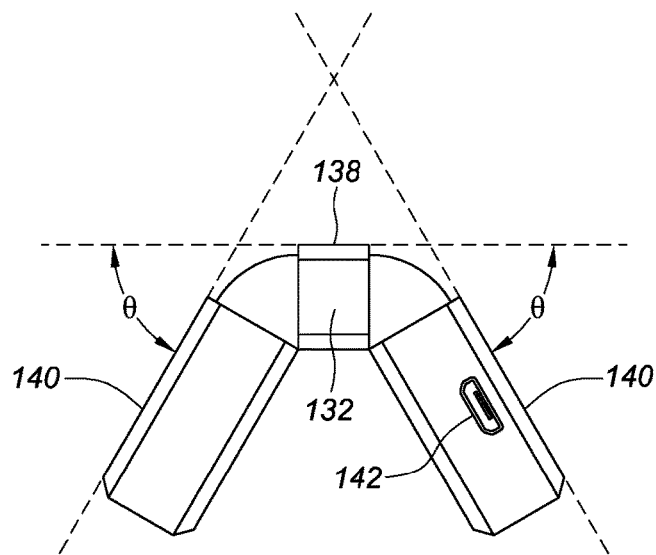
FIG. 8C is an end view of the open position of the charging case of FIG. 8B, consistent with various aspects of the present disclosure.

FIG. 8C is an end view of the open position of the charging case of FIG. 8B, consistent with various aspects of the present disclosure. As described herein, the open position of the charging case 130 can include the wing elements 134 pivoting with respect to the central frame element 132 to allow removal and/or insertion of the electronic cigarette 10E from the holder 136 of the charging case 132. The open position (i.e., a second position) can create an angle θ (see FIG. 8C) between the first central frame surface and each of the wing element surfaces. The angle θ created can vary from 0° to 90° (e.g., 5°, 10°, 15°, 20°, 25°, 30°, 35°, 40°, 45°, 50°, 55°, 60°, 70, 80, etc.).

Figure 8D:
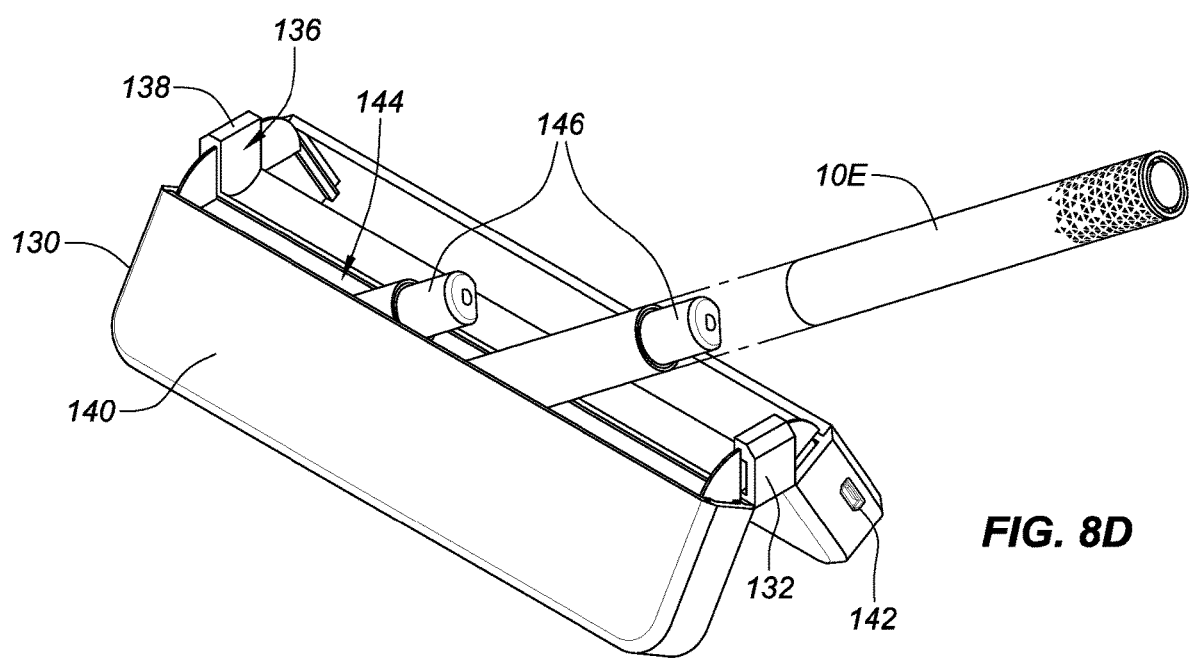
FIG. 8D is a side, top, and end view of the charging case of FIGS. 8A-C showing the charging case in an open position with the electronic cigarette removed and liquid reservoirs in a compartment of the charging case, consistent with various aspects of the present disclosure.

FIG. 8D is a side, top, and end view of the charging case of FIGS. 8A-B showing the case in an open position with the electronic cigarette removed and liquid reservoirs, consistent with various aspects of the present disclosure. As described herein, the electronic cigarette 10E can be removed from the charging case 130. One or more of the winged elements 134 can include a compartment 144 (i.e., an opening, a pocket, a space, a slot, etc.). The compartment 140 can be used to store various items. For example, liquid reservoirs, spare batteries, mouthpiece tips, and/or other accessories for the electronic cigarette. As shown in the embodiment in FIG. 8D, two liquid reservoirs 146 are positioned in the compartment 144 to allow for convenient coupling with the electronic cigarette 10E.

Figure 9:
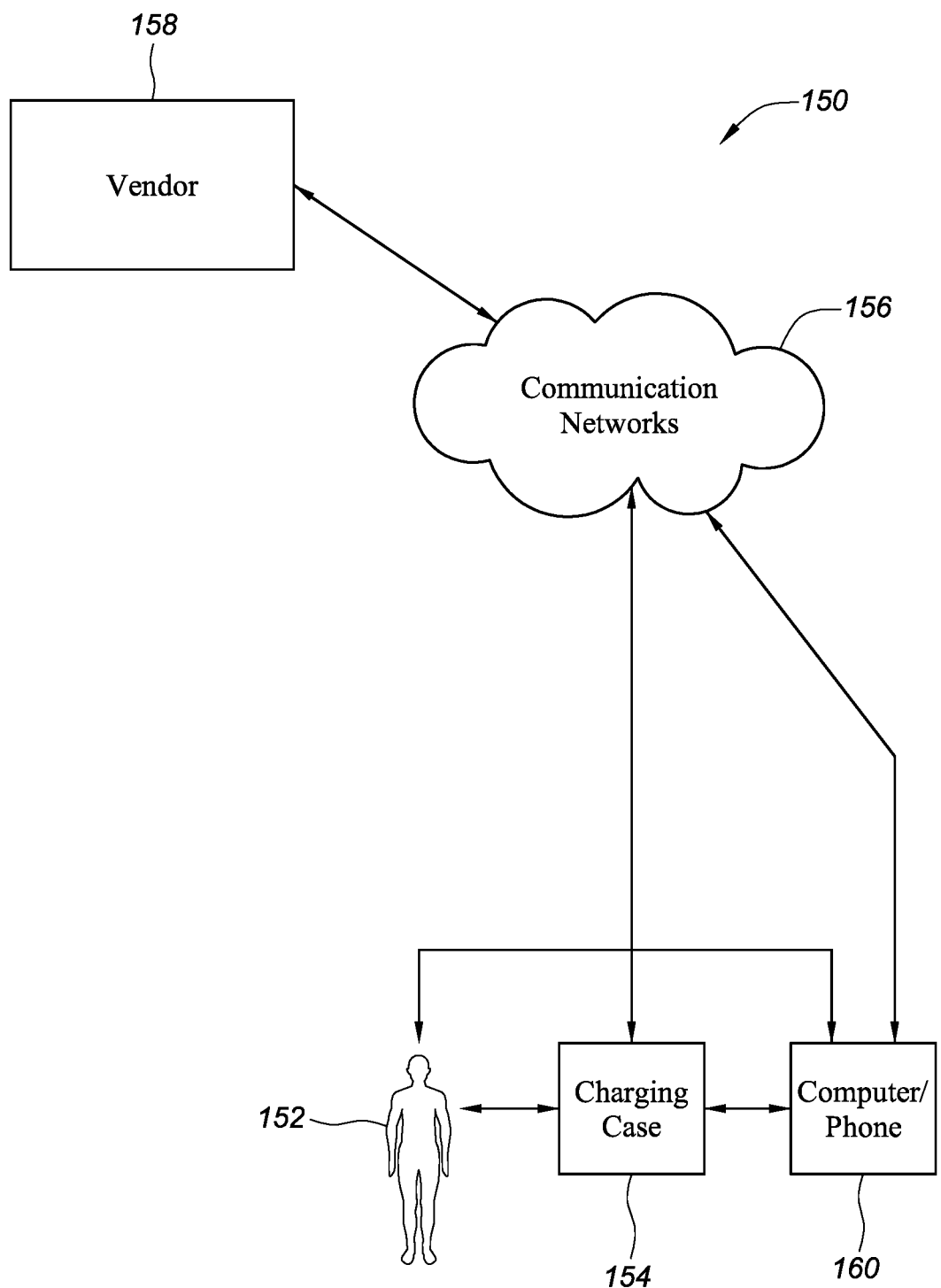
FIG. 9 is an example of a product ordering system for an electronic cigarette, consistent with various aspects of the present disclosure.

FIG. 9 is an example of a product ordering system for an electronic cigarette, consistent with various aspects of the present disclosure. One embodiment of the product ordering system 150 can involve a user 152 that can actuate, for example, a button on a charging case 154. The charging case 154 can communicate directly through a communication network 156 (e.g., a server-based network, LAN, WAN, Internet, intranet, Wi-Fi network, Bluetooth network, cellular network and/or the like, etc.) to a vendor 158. In another embodiment, the charging case 154 can be connected (wirelessly or by wire/connector/cable etc.) to a computer 160 (e.g., a PC, a handheld computer (tablet, etc.), a mobile phone, a laptop, etc.) and the computer 160 can communicate with the vendor 158 through the communication network 156.

The communication sent to the vendor 158 can include, for example, orders for replacement parts such as additional liquid reservoirs, spare batteries, mouthpiece tips, and/or other accessories for the electronic cigarette. The user 152 can create, using, for example, the computer 160, a desired default order of replacement parts. The button on the charging case can trigger, through communication from an MCU (not shown in FIG. 9) of the charging case 154 and the communication network 156 to the vendor 158, a shipment of the default order to the user.

Additional information regarding charging of electronic cigarettes can be found in U.S. application Ser. No. 14/711,593 (attorney docket no. 065887-000624) filed on 13 May 2015, and U.S. application Ser. No. 14/912,141 (attorney docket no. 065887-000825) filed on 15 Feb. 2016, which are hereby incorporated by reference in their entirety for all purposes as if fully set forth herein.

In summary, various embodiments of the present disclosure are directed to a charging case for an electronic smoking device comprise a container configured to house the electronic smoking device, a micro-control unit ("MCU"), wherein the MCU is coupled with the charging case and configured to facilitate charging a first rechargeable battery for the electronic smoking device, a plurality of connecting pins, where the connecting pins are coupled with the charging case and configured to facilitate electrical coupling between the electronic smoking device and the MCU; and a connector movably coupled with the charging case and configured to connect the MCU to external circuitry. The container is further configured to house one or more of a liquid reservoir for the electronic smoking device and a second rechargeable battery for the electronic smoking device. The one or more of the liquid reservoir for the electronic smoking device and the second rechargeable battery for the electronic smoking device are electrically coupled with the MCU. The charging case further comprises a charging case battery for charging one or more of the first battery and the second battery. The charging case further comprises a wireless communication module. The wireless communication module comprises a Bluetooth module. The MCU and the wireless communication module are integrated into a single component. The electronic smoking device can be charged when the connector is connected to external circuitry. The connector is coupled with a movable member. The movable member comprises a flexible element or a pivoting member. The charging case still further comprises a recessed location for the movable member and the connector.

Some embodiments of a system comprise an electronic smoking device comprising a battery, an eCig memory storing a first set of computer-readable instructions, and control electronics, and a charging case for an electronic smoking device comprising: a container configured to house the electronic smoking device, a micro-control unit ("MCU"), wherein the MCU is configured to facilitate charging the electronic smoking device, a connector, wherein the connector is movably coupled with the charging case and configured to connect to external circuitry; and a charging case battery, where the charging case battery is configured to charge the battery of the electronic smoking device. The charging case further comprises a wireless communication module for communication with external circuitry. The wireless communication module of the charging case comprises a Bluetooth module. The MCU and the wireless communication module of the charging case are integrated into a single component. The electronic smoking device can be charged when the connector is connected to external circuitry. The battery of the electronic smoking device can be charged by the charging case battery when the connector is not connected to external circuitry. The movably coupled connector comprises a flexible element or a pivoting member. The charging case further comprising a recessed location for the movable member and the connector. The charging case further comprises a button, wherein the button is configured to trigger the MCU to communicate through a communication network with a vendor.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

Although several embodiments have been described above with a certain degree of particularity, those skilled in the art could make numerous alterations to the disclosed embodiments without departing from the spirit of the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

It will be appreciated that the terms "proximal" and "distal" may be used throughout the specification with reference to a clinician manipulating one end of an instrument used to treat a patient. The term "proximal" refers to the portion of the instrument closest to the clinician and the term "distal" refers to the portion located furthest from the clinician. It will be further appreciated that for conciseness and clarity, spatial terms such as "vertical," "horizontal," "up," and "down" may be used herein with respect to the illustrated embodiments. However, surgical instruments may be used in many orientations and positions, and these terms are not intended to be limiting and absolute.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Various embodiments of the present disclosure are directed to a charging case for an electronic smoking device comprising a container configured to house the electronic smoking device, a micro-control unit ("MCU"), wherein the MCU is coupled with the charging case and configured to facilitate charging a first rechargeable battery for the electronic smoking device, a plurality of connecting pins, where the connecting pins are coupled with the charging case and configured to facilitate electrical coupling between the electronic smoking device and the MCU; and a connector movably coupled with the charging case and configured to connect the MCU to external circuitry.

Some embodiments of a system comprising an electronic smoking device comprising a battery, an eCig memory storing a first set of computer-readable instructions, and control electronics, and a charging case for an electronic smoking device comprising: a container configured to house the electronic smoking device, a micro-control unit ("MCU"), wherein the MCU is configured to facilitate charging the electronic smoking device, a connector, wherein the connector is movably coupled with the charging case and configured to connect to external circuitry; and a charging case battery, where the charging case battery is configured to charge the battery of the electronic smoking device.

LIST OF REFERENCE SIGNS 10 electronic smoking device
12 end cap
14 power supply portion
16 atomizer/liquid reservoir portion
18 light emitting diode (LED)
20 air inlets
22 battery
24 control electronics
26 airflow sensor
28 atomizer
30 heating coil
32 wick
34 central passage
36 liquid reservoir
38 air inhalation port
40 controller circuitry
42 electrical contact apertures
44 electrical contacts (or connectors)
46-48 not used
48 not used
50 charging case system
52 charging case
54 micro-control unit (MCU)
56 connector
60 spare battery
62 liquid reservoir
64 external circuitry
66 movable member
68 flexible element
70 recessed portion
72-78 not used
80 charging case system
82 charging case
84 wireless module
86 rechargeable battery
90 charging case system
92 charging case
94-98 not used
100 charging case system
102 movable member
104 flexible element
106 charging status indicator
108 not used
110 charging case system
112 charging case
114 holder (for eCig)
116 movable member
118 connector
120 connector
122-128 not used
130 charging case
132 central frame element
134 wing element
136 holder (for eCig)
138 first central frame element surface
140 first wing element surface
142 connector
144 compartment
146 liquid reservoir
148 not used
150 system
152 user
154 charging case
156 communication network
158 vendor
160 computer/phone

The invention claimed is:

1. A charging case for an electronic smoking device comprising:
a container configured to house the electronic smoking device;
a micro-control unit ("MCU") configured to facilitate charging a first rechargeable battery for the electronic smoking device;
a plurality of connecting pins-configured to facilitate electrical coupling between the electronic smoking device and the MCU; and
a connector movably coupled with the container and configured to connect the MCU to external circuitry;
wherein the container is pivotably coupled with two wing elements, each wing element being configured to pivot at an angle with respect to the container to allow for removal or insertion of the electronic smoking device; and
wherein one or more of the wing elements comprises a compartment for storing a portion of the electronic smoking device or an accessory for the electronic smoking device; and
wherein the electronic smoking device is at least partially visible when the two wing elements are in a closed position.

2. The charging case of claim 1, wherein the electronic smoking device can be charged when the connector is connected to external circuitry.

3. The charging case of claim 1, wherein at least one of the wing elements includes the connector.

4. The charging case of claim 1, wherein the container is further configured to house one or more of a liquid reservoir for the electronic smoking device and a second rechargeable battery for the electronic smoking device.

5. The charging case of claim 4, wherein the one or more of the liquid reservoir for the electronic smoking device and the second rechargeable battery for the electronic smoking device are electrically coupled with the MCU.

6. The charging case of claim 4, wherein the charging case further comprises a charging case battery for charging one or more of the first rechargeable battery and the second rechargeable battery.

7. The charging case of claim 1, further comprising a wireless communication module.

8. The charging case of claim 7, wherein the wireless communication module comprises a Bluetooth module.

9. The charging case of claim 7, wherein the MCU and the wireless communication module are integrated into a single component.

10. The charging case of claim 1, wherein the connector is coupled with a movable member.

11. The charging case of claim 10, wherein the movable member comprises a flexible element or a pivoting member.

12. The charging case of claim 10, further comprising a recessed location for the movable member and the connector.

13. A system comprising:
an electronic smoking device comprising
a battery,
an eCig memory storing a first set of computer-readable instructions, and
control electronics; and
a charging case for the electronic smoking device comprising:
a container configured to house the electronic smoking device;
a micro-control unit ("MCU"), wherein the MCU is configured to facilitate charging the electronic smoking device;
a connector, wherein the connector is movably coupled with the container and configured to connect to external circuitry; and
a charging case battery, where the charging case battery is configured to charge the battery of the electronic smoking device;
wherein the container is pivotably coupled with two wing elements, each wing element being configured to pivot at an angle with respect to the container to allow for removal or insertion of the electronic smoking device; and
wherein one or more of the wing elements comprises a compartment for storing a portion of the electronic smoking device or an accessory for the electronic smoking device; and
wherein the electronic smoking device is at least partially visible when the two wing elements are in a closed position.

14. The system of claim 13, wherein the electronic smoking device can be charged when the connector is connected to external circuitry.

15. The system of claim 13, wherein the battery of the electronic smoking device can be charged by the charging case battery when the connector is not connected to external circuitry.

16. The system of claim 13, wherein the connector is coupled with a movable member comprising a flexible element or a pivoting member.

17. The system of claim 16, the charging case further comprising a recessed location for the movable member and the connector .

18. The system of claim 13, the charging case further comprising a wireless communication module for communication with external circuitry.

19. The system of claim 18, wherein the wireless communication module of the charging case comprises a Bluetooth module.

20. The system of claim 18, wherein the MCU and the wireless communication module of the charging case are integrated into a single component.

* * * * *